United States Patent
Frieser et al.

(10) Patent No.: US 11,068,681 B2
(45) Date of Patent: Jul. 20, 2021

(54) VERIFICATION OF A SECURITY DOCUMENT

(71) Applicants: KURZ Digital Solutions GmbH & Co. KG, Fürth (DE); OVD Kinegram AG, Zug (CH)

(72) Inventors: Uwe Frieser, Büchenbach (DE); Michael Grau, Neunkirchen am Brand (DE); René Staub, Hagendorn (CH); Michael Hoffmann, Walchwil (CH)

(73) Assignees: Kurz Digital Solutions GmbH & Co. KG, Furth (DE); OVD Kinegram AG, Zug (CH)

(*) Notice: Subject to any disclaimer, the term of this patent is extended or adjusted under 35 U.S.C. 154(b) by 70 days.

(21) Appl. No.: 16/470,019

(22) PCT Filed: Dec. 13, 2017

(86) PCT No.: PCT/EP2017/082681
§ 371 (c)(1),
(2) Date: Jun. 14, 2019

(87) PCT Pub. No.: WO2018/109035
PCT Pub. Date: Jun. 21, 2018

(65) Prior Publication Data
US 2019/0384955 A1    Dec. 19, 2019

(30) Foreign Application Priority Data

Dec. 16, 2016 (DE) .......................... 102016124717.0
Feb. 9, 2017 (DE) .......................... 102017102556.1

(51) Int. Cl.
*G06K 7/14*    (2006.01)
*G06T 7/73*    (2017.01)
(Continued)

(52) U.S. Cl.
CPC ....... *G06K 7/1417* (2013.01); *G06K 7/10366* (2013.01); *G06K 9/00442* (2013.01);
(Continued)

(58) Field of Classification Search
CPC ............. G06K 7/1417; G06K 7/10366; G06K 9/00442; G06K 9/2018; G06K 9/2036;
(Continued)

(56) References Cited

U.S. PATENT DOCUMENTS

| 4,452,843 | A | 6/1984 | Kaule et al. |
| 6,373,965 | B1* | 4/2002 | Liang ..................... B41M 3/144 |
| | | | 382/112 |

(Continued)

FOREIGN PATENT DOCUMENTS

| AU | 2003293901 B2 | 8/2004 |
| DE | 10260124 A1 | 7/2004 |

(Continued)

OTHER PUBLICATIONS

Color Depth, Wikipedia, pp. 1-4, Nov. 2016 (Translation of Applicant's "Farbtiefe (Computergrafik)" (Year: 2016).*

(Continued)

*Primary Examiner* — Christopher M Brandt
(74) *Attorney, Agent, or Firm* — Hoffmann & Baron, LLP

(57) ABSTRACT

A method for verifying a security document by means of a reading device wherein first transmission and/or reflection properties of a first region of the security document are detected in a first spectral range by the reading device and a first data set specifying these properties is generated therefrom, wherein the first region at least in some regions overlaps an optical security element arranged on the security document or embedded in the security document and wherein second transmission and/or reflection properties of the first region of the security document are detected in a (Continued)

second spectral range by the reading device and a second data set specifying these properties is generated therefrom, wherein the first spectral range differs from the second spectral range, and wherein, the authenticity of the security document and/or of the security element is checked on the basis of at least the first data set and the second data set.

72 Claims, 11 Drawing Sheets

(51) Int. Cl.

| | | |
|---|---|---|
| *G07D 7/00* | (2016.01) | |
| *G07D 7/1205* | (2016.01) | |
| *G07D 7/206* | (2016.01) | |
| *G07D 7/207* | (2016.01) | |
| *G06K 7/10* | (2006.01) | |
| *G06K 9/00* | (2006.01) | |
| *G06K 9/20* | (2006.01) | |
| *G06K 9/38* | (2006.01) | |
| *G06K 9/46* | (2006.01) | |
| *G06K 9/54* | (2006.01) | |
| *G06T 7/00* | (2017.01) | |
| *G07D 7/202* | (2016.01) | |

(52) U.S. Cl.
CPC ......... *G06K 9/2018* (2013.01); *G06K 9/2036* (2013.01); *G06K 9/38* (2013.01); *G06K 9/4661* (2013.01); *G06K 9/54* (2013.01); *G06T 7/0002* (2013.01); *G06T 7/74* (2017.01); *G07D 7/0032* (2017.05); *G07D 7/1205* (2017.05); *G07D 7/205* (2013.01); *G07D 7/206* (2017.05); *G07D 7/207* (2017.05); *G06T 2207/30176* (2013.01)

(58) Field of Classification Search
CPC ......... G06K 9/38; G06K 9/4661; G06K 9/54; G06K 7/12; G06K 9/2054; G06T 7/74; G06T 7/0002; G06T 2207/30176; G07D 7/0032; G07D 7/1205; G07D 7/206; G07D 7/207; G07D 7/205; G07D 7/12; B42D 25/29
See application file for complete search history.

(56) References Cited

U.S. PATENT DOCUMENTS

| | | | | |
|---|---|---|---|---|
| 6,827,769 | B2* | 12/2004 | Auslander | C09D 11/50 106/31.32 |
| 7,654,579 | B2* | 2/2010 | Hansen | G07D 7/003 283/72 |
| 8,702,005 | B2* | 4/2014 | Peters | B42D 25/328 235/492 |
| 2003/0041774 | A1 | 3/2003 | Auslander et al. | |
| 2005/0078851 | A1 | 4/2005 | Jones et al. | |
| 2006/0115139 | A1* | 6/2006 | Joshi | G07D 7/121 382/135 |
| 2007/0177131 | A1 | 8/2007 | Hansen | |
| 2008/0259416 | A1 | 10/2008 | Peters et al. | |
| 2011/0156864 | A1* | 6/2011 | Green | G06K 19/07749 340/5.2 |
| 2011/0298204 | A1 | 12/2011 | Eschbach | |
| 2017/0368864 | A1* | 12/2017 | Walter | B42D 25/29 |
| 2018/0154678 | A1 | 6/2018 | Olszowka et al. | |

FOREIGN PATENT DOCUMENTS

| | | |
|---|---|---|
| DE | 102004007379 B3 | 9/2005 |
| DE | 102004059798 A1 | 6/2006 |
| DE | 60213244 T2 | 6/2007 |
| DE | 102009057360 A1 | 6/2011 |
| DE | 102010062032 A1 | 5/2012 |
| DE | 102011005518 A1 | 9/2012 |
| DE | 102013009474 A1 | 12/2014 |
| DE | 102014207323 A1 | 10/2015 |
| DE | 102015106800 A1 | 11/2016 |
| EP | 2384901 A1 | 11/2011 |
| EP | 2977935 A1 | 1/2016 |
| GB | 2403798 A | 12/2005 |
| WO | WO8103507 | 12/1981 |

OTHER PUBLICATIONS

Bhensadadiya, et al., "Increasing Efficiency of Template-Matching Algorithm Using Binary-Image Instead of Color-Image", International Journal of Engineering Development and Research, vol. 2, No. 2, pp. 2811-2814 (Jun. 2014).
Sean de Wolski, "How to Align Images Together Automatically: Round 1", MATLAB Answers, MathWorks, pp. 1-5 (May 2011).
Farbtiefe(Computergrafik), Wikipedia, pp. 1-5 (Nov. 2016).
ISO 12647-1, "Graphic Technology—Process Control for the Production of Half-Tone Colour Separations, Proof and Production Prints—Part 1: Parameters and Measurement Methods", pp. 1-24 (2013).
ISO 13655, "Graphic Technology—Spectral Measurement and Colorimetric Computation for Graphic Arts Images", pp. 1-57 (2017).
ISO/CIE 11664-4, Colorimetry—Park 4: CIE 1976 L*a*b* Colour Space, pp. 1-16 (2019).
International Search Report for corresponding Inter'l Application PCT/EP2017/082681, pp. 1-10 (dated Jul. 2018).
German Examination Report for corresponding German Patent Application No. 10 2017 102 556.1, pp. 1-8 (dated Oct. 2017).

* cited by examiner

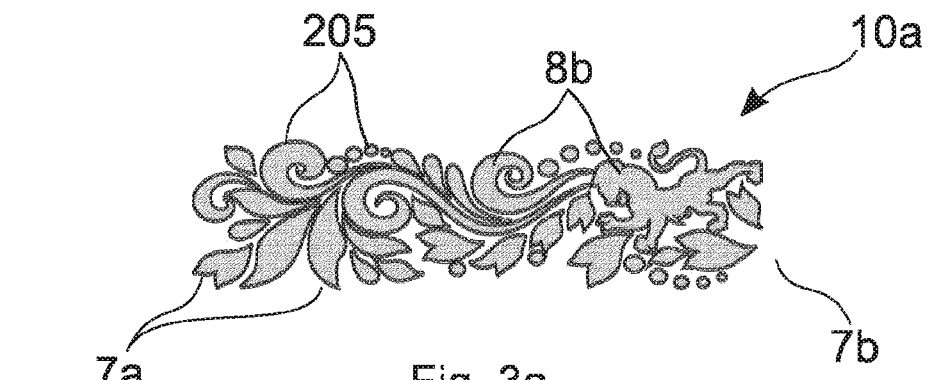
Fig. 3a
Fig. 3b
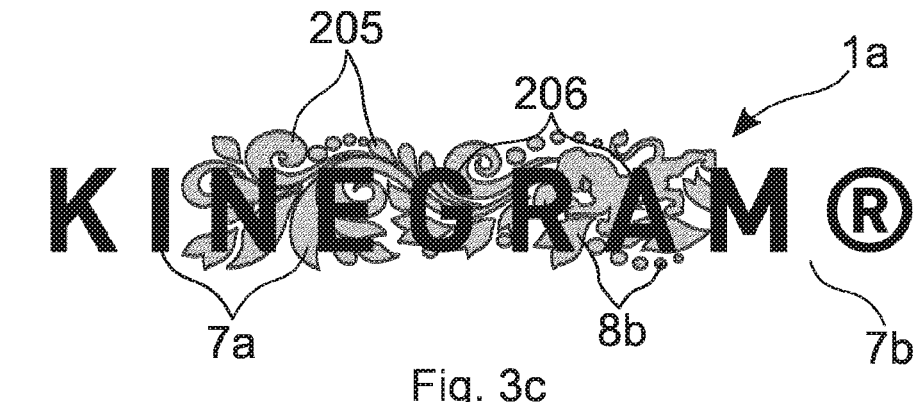
Fig. 3c
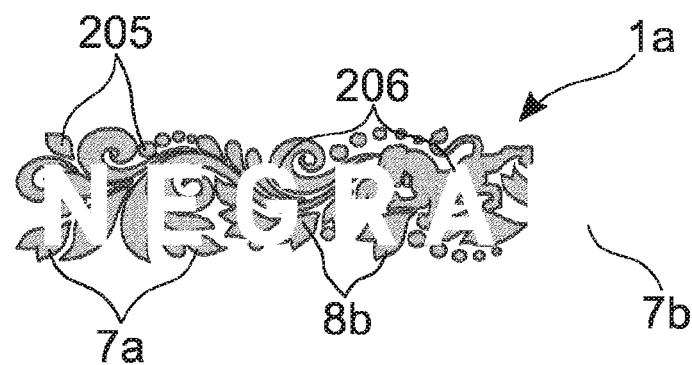
Fig. 3d

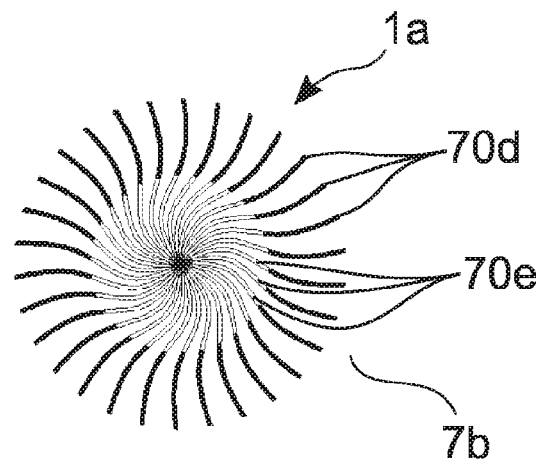
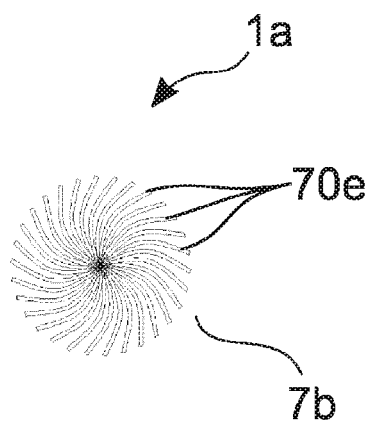
Fig. 6a    Fig. 6b
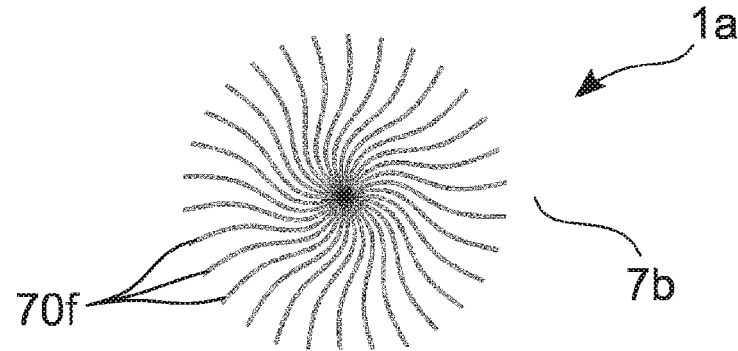
Fig. 6c
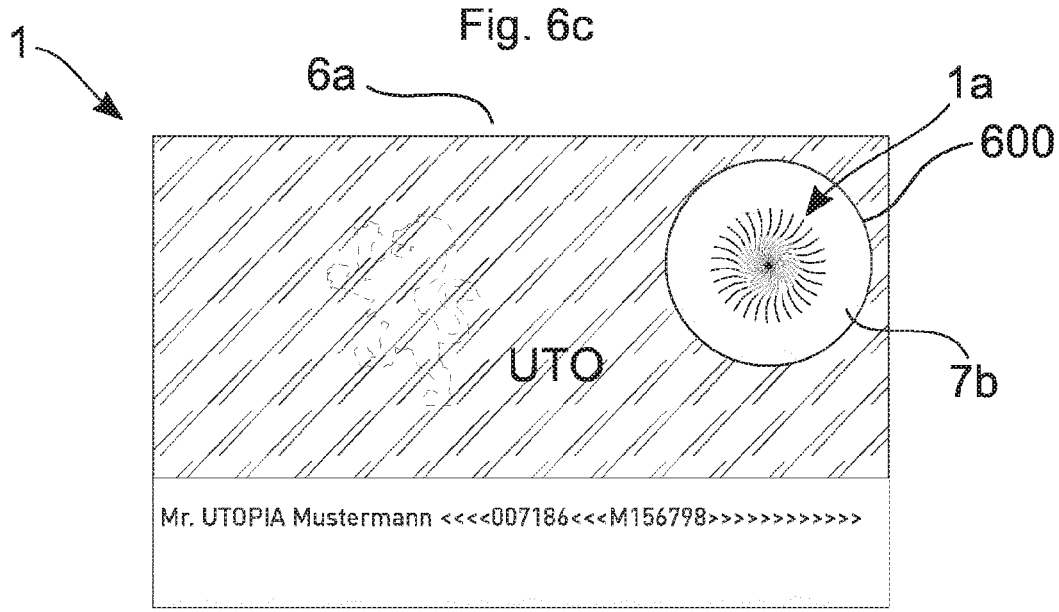
Fig. 6d

1

VERIFICATION OF A SECURITY DOCUMENT

This application claims priority based on an International Application filed under the Patent Cooperation Treaty, PCT/EP2017/082681, filed Dec. 3, 2017, which claims priority to DE102016124717.0, filed Dec. 16, 2016 and DE102017102556.1, filed Feb. 9, 2017.

BACKGROUND OF THE INVENTION

The invention relates to a method for verifying a security document, as well as a security document, a device and a security element.

Automated document controls are becoming increasingly widespread. Thus, for example, ePassport gates, Automated Border Control (ABC) or Automated Passport Control (APC) are known. Instead of documents being checked manually, the users use self-service machines. The users place their identification documents, travel documents or boarding passes in or on the machine and the latter reads the document.

In automated document control, standard checking devices with particular illumination and viewing configurations are preferably used. During the automated checking and verification of the travel or identification document for authenticity and for whether the holder is the legitimate holder, in particular the biometric data of the chip and machine-readable data on the document are used. Such a device is described in DE10 2013 009 474 A1.

Optical security elements, in particular diffractive security elements such as holograms, which represent a recognizable safeguard against manipulations for the human observer, usually cannot be recognized or detected by means of this machine detection. To compound matters further, in the presence of diffractive security elements the light of the illumination is diffracted into the camera and the recognizability of the machine-readable personalizations lying underneath or further machine-detectable features is reduced or entirely prevented.

SUMMARY OF THE INVENTION

The object of the present invention is thus to improve the machine verification of security documents.

The object is achieved by a method according to claim 1 as well as by a security document according to claim 62, a device according to claim 63 and a security element according to claim 67.

Such a method for verifying a security document by means of a reading device is characterized in that first transmission and/or reflection properties of a first region of the security document are detected in a first spectral range by the reading device and a first data set specifying these properties is generated therefrom, wherein the first region overlaps at least in some regions an optical security element arranged on the security document or embedded in the security document, in that second transmission and/or reflection properties of the first region of the security document are detected in a second spectral range by the reading device and a second data set specifying these properties is generated therefrom, wherein the first spectral range differs from the second spectral range and in that the authenticity of the security document and/or of the security element is checked on the basis of at least the first data set and the second data set.

The device, in particular reading device, for verifying a security document is characterized in that it has a piece of sensor equipment which is designed such that it detects first transmission and/or reflection properties of a first region of the security document in a first spectral range and generates a first data set specifying these properties therefrom, wherein the first region overlaps at least in some regions an optical security element arranged on the security document or embedded in the security document, in that the sensor equipment is further designed such that it detects second transmission and/or reflection properties of the first region of the security document in a second spectral range and generates a second data set specifying these properties therefrom, wherein the first spectral range differs from the second spectral range, and in that the device has a piece of analysis equipment which is designed such that it checks the authenticity of the security document and/or of the security element on the basis of at least the first data set and the second data set.

It is hereby achieved that security documents and/or security elements, in particular regions of security documents and/or security elements containing security features, in particular identification documents of all types, in particular travel documents, securities, banknotes, payment instruments, certificates, etc., can be checked for their authenticity by means of an automated document control, and the protection against forgery of the security documents is hereby further improved.

Advantageous embodiments of the invention are described in the dependent claims.

An optical security element is a security element which generates an item of optical information which is identifiable for the human observer, in particular optically variable information. For this, it can also be necessary to use aids such as for example a magnifier or a UV lamp (UV=ultraviolet, ultraviolet light). An optical security element here preferably consists of the transfer ply of a transfer film, a laminating film or a film element, in particular in the form of a security thread. The security element here is preferably applied to the surface of the security document and/or at least partially embedded in the security document.

Further, it is possible that the security document has not just one optical security element, but several optical security elements, which are preferably formed differently and/or are differently introduced into the security document and/or applied to the security document. Optical security elements here can be applied to a top side of the security document over the whole surface, be completely embedded between layers of the security document, but also be applied to a top side of the security document only over part of the surface, in particular in the form of strips or threads or in patch form, and/or embedded in one layer of the security document. The carrier substrate of the security document in the region of the optical security element preferably has a through-hole or window region, with the result that the security element can be observed optically both in reflected light from the front and rear side of the security document and in transmitted light.

The detection of the transmission and/or reflection property of a region of the security is document at least partially comprising the security element in different spectral ranges makes it possible to improve the machine detection of the authenticity features of the security feature because of the different appearances and to eliminate possible disruptive properties of optically active and in particular optically variable elements of the security element. This can be still further improved in that not only two, but also three, four or more spectral ranges differing from each other can be defined, in which the transmission and/or reflection properties of the first region of the security document are detected by the reading device.

Further, the reading device can output an item of information about the authenticity, in particular an assessment of the authenticity, of the security element or of the security document. The assessment of the authenticity of the security element can be output by the reading device as a probability and/or confidence level, which preferably quantifies the assessment of the authenticity, in particular the authenticity.

Thus, third and/or fourth transmission and/or reflection properties of the first region of the security document can be detected in a third spectral range or in a fourth spectral range by the reading device and a third data set or a fourth data set specifying these properties can be generated therefrom, wherein the third or fourth spectral range differs from the first and second spectral range. The authenticity of the security document is then advantageously checked on the basis of at least the first, the second, the third and/or the fourth data set.

Through the detection of the transmission and/or reflection properties in three or more different spectral ranges, it can be ensured that one or more special features inherent in the security element are securely detected, whereby the checking for authenticity is improved. Appearances which are only to be seen in a specific spectral range can thus be reliably detected and used for the authenticity check.

The transmission and/or reflection properties of the first region are detected by the reading device preferably in reflected light from the front side of the security document, in reflected light from the rear side of the security document and/or in transmitted light. In the case of reflected-light detection from the front or rear side the security document here is preferably irradiated in each case by a reading device from the front or rear side and the image showing in the reflection is detected by means of one or more sensors of the reading device, which are likewise arranged on the front or rear side of the security element. Alternatively, a first detection can be effected from one side, the document can be turned over and then the detection is effected from the other side. With the aid of particular features, such as for example an outer shape of the document or a window shape, the two detected sides or the front and rear side are joined together electronically. In the detection of the transmission property of the first region in transmitted light the light sources and the one or more sensors of the reading device are preferably arranged on different sides of the security document.

Thus, for example, the first, second, third and/or fourth transmission and/or reflection properties of the first region of the security document are detected in the first, second third and/or fourth spectral range by the reading device from sides of the front side of the security document in reflected light, from sides of the rear side of the security document in reflected light and/or in transmitted light. A first, second, third or fourth data set specifying these properties is generated therefrom by the reading device.

The first, second, third and/or fourth data set preferably comprises the transmission and/or reflection properties of the first region not just in a single illumination/observation situation, but in two or more illumination and/or observation situations. For example, the first, second, third and/or fourth data set can thus specify the reflection property of the first region in reflected light from the front side and the rear side in the respective spectral range, specify the reflection property of the first region in reflected light from the front or rear side as well as the transmission property in transmitted light in the respective spectral range, and specify the reflection property of the first region in reflected light from the front and rear side as well as the transmission property in transmitted light in the respective spectral range.

Through a corresponding detection of the transmission and/or reflection property of the first region and the use and/or comparison of these data, the margin of error, in particular with respect to the authenticity statement, in particular with respect to wear and/or contamination of the security document, can be further improved and furthermore the recognition of forgeries or manipulations can also be further improved.

Through the use of spectral ranges which lie in the wavelength range not visible to the human observer, disruptions of the machine detection due to optically active elements of the security element, in particular optically variable elements of the security element, can be recognized by corresponding comparison and eliminated in the machine detection. The margin of error and the checking result can hereby be further improved.

The data sets relating to the front side are preferably compared with the data sets of the rear side. In order that the transmission and/or reflection properties of the front and rear sides can be detected, it can be necessary to turn the document over in the reading device.

The first, second, third and/or fourth spectral range is preferably selected from the group: an IR range (IR=infrared, infrared light) of the electromagnetic radiation, in particular the wavelength range of from 850 nm to 950 nm, a VIS range (VIS=light visible with the naked eye of a human) of the electromagnetic radiation, in particular the wavelength range of from 400 nm to 700 nm, and a UV range of the electromagnetic radiation, in particular from the wavelength range of from 1 nm to 400 nm, preferably from the range 240 nm to 380 nm, further preferably from the range 300 nm to 380 nm.

The security element of the security document preferably comprises one or more security features. The first region here is preferably defined such that it at least partially overlaps one or more of the security features of the security element, preferably overlaps at least two security features of the security document. Further, it is also possible that the security document also has another one or more security features, which are arranged overlapping or partially overlapping with the first region. Such security features of the security document can consist for example of colored fibers, of a basecoat print or a metallic thread. The basecoat print can have further security features and at least in partial regions be designed, for example, fluorescent under UV radiation or contain an IR upconverter or be designed partially transparent or opaque in the IR range. As a physical process, an IR upconverter utilizes the sequential absorption of at least two photons, in particular IR photons or electromagnetic waves in the infrared wavelength range, in order then to re-emit the thus-accumulated absorbed energy in a subsequent emission of a photon, in particular a VIS photon or an electromagnetic wave in the visible wavelength range, wherein the wavelength of the emitted photon or of the wave is smaller than the respective wavelength of the at least two absorbed photons or electromagnetic waves. The underprint can in particular be shaped in the form of a machine-readable coding, for example a barcode or machine-readable writing.

If several security features are present in the first region, then they overlap one another preferably at least in some regions. However, it is also possible that the security features are arranged spaced apart from each other in the first region or adjoin each other, in particular are in direct contact with each other when observed in reflected light and/or in transmitted light.

Through comparison of the first and second data sets and optionally of the third and fourth data sets, one or more relative values relating to two or more security features of the security element are determined.

Thus, for example, the relative position, in particular the spacing of two or more security features of the security elements and/or of the security document relative to each other, is determined as a relative value from these data sets.

Further, the relative size of two or more security features of the security element and/or security document can be determined as a relative value.

Further, the relative shaping of two or more security features of the security element and/or security document relative to each other can be determined as a relative value. Thus, in particular, the register accuracy of the orientation and shaping of image elements of the two or more security features is determined through the comparison of the data sets.

By register or registration or register accuracy or registration accuracy is meant a positional accuracy of two or more elements and/or layers relative to each other. The register accuracy is to vary within a given tolerance, which is to be as small as possible. At the same time, the register accuracy of several elements and/or layers relative to each other is an important feature in order to increase the process reliability. The positionally accurate positioning can be effected in particular by means of sensory, preferably optically, detectable register marks or registration marks.

These register marks or registration marks can represent either special separate elements and/or regions and/or layers or even be part of the elements and/or regions and/or layers to be positioned.

Further, the relative covering and/or relative orientation and/or relative size of two or more security features of the security element and/or security document relative to each other can be determined as a relative value through comparison of the data sets.

The relative values of the two or more security features determined by the comparison are further preferably compared with allocated reference values and the authenticity is denied if the deviation lies outside an allocated tolerance range.

Numerous advantages are achieved through this procedure. Through the use of relative values and not absolute values, the corresponding checking is much less susceptible to the large deviations from "ideal" measurement conditions occurring in practice. It is hereby possible, for example, to eliminate measurement deviations which are caused for example by the contamination and/or wear of the security document and/or of the reading device and/or by a defective calibration of the reading device. Further, the recognition of forgeries can hereby also be clearly improved: thus, firstly, it is difficult for the forger to achieve a correspondingly register-accurate arrangement and shaping of different security features in a forgery, because of the register inaccuracy of the production methods used for this. Because of the determination of corresponding relative values it is possible, for the above-named reasons, to clearly reduce in particular the tolerance range compared with a comparison of absolute values and thus still to securely detect even slight deviations. This results in a clear increase in the detection of forgeries.

To check the authenticity of the security document, in particular the following steps can thus be carried out:

The positional arrangement and/or shaping of a first security feature of the security element is determined by means of the first data set. The positional arrangement and/or shaping of a second security feature of the security element is determined by means of the second data set. The determined positional arrangements and/or shapings are then preferably compared with each other in order to determine the relative positional arrangement, in particular spacing, the relative size, the relative shaping, in particular the register accuracy of the orientation and shaping of image elements, the covering and/or the orientation of the two security features of the security element relative to each other. Furthermore, the positional arrangement and/or shaping of a third and/or fourth security feature of the security element are advantageously determined by means of the third or fourth data set respectively. These can then also be compared with each other in a further step.

The security features preferably have in each case one or more image elements or image regions and furthermore ideally a background region surrounding the image elements. A security feature advantageously comprises one or more different image elements, which are shaped in particular as plane elements and/or line elements. The image elements of different security elements preferably become detectable or not detectable under illumination in the different spectral ranges and/or produce a predetermined contrast, in particular to the background region.

The security features are further preferably designed such that in at least one of the spectral ranges detected by the reading device, in particular in the first, second, third and/or fourth spectral range, a contrast between the image elements and the background region is generated in reflection and/or transmission.

By contrast in reflection and/or transmission is meant in particular a difference in lightness and/or a difference in color. In the case of a difference in lightness the contrast is preferably defined as follows:

$$K=(L_{max}-L_{min})/(L_{max}+L_{min}),$$

wherein $L_{max}$ and $L_{min}$ correspond to the lightnesses of the background, or respectively of the security feature, or vice versa, depending on whether the lightness of the security element or that of the background is lighter. The values of the contrast preferably lie between 0 and 1.

Alternatively, a contrast with respect to a difference in lightness can be defined in the following way: $K=(L_{Background}-L_{Feature})/(L_{Background}+L_{Feature})$. The value range now preferably lies between −1 and +1. An advantage of this definition is in particular that a "contrast inversion" also involves a change in the sign.

In the assessment of a difference in contrast and/or of a difference in color and/or also of the appearance in the case of inks, it must in particular be considered that there are different possibilities for the creation of colored designs. The absorbing power of the material which is printed on, and/or the fillers in the ink, which result in more or less scattering depending on the refractive index of the respective ink, and/or also on the type of reflective layer which lies behind or in front of the ink, has an effect on the color impression. The illumination type and/or direction can also have a marked influence on the reflection and/or transmission behavior of a color print. Furthermore, there are inks which preferably give the same impression illuminated at different angles and which alter the color impression in particular depending on the illumination and the illumination angle, such as for example interference pigments and/or liquid crystals.

A color layer can be substantially transparent in the VIS range because of dyes or fine pigments. This means that the color layer preferably absorbs certain ranges of the spectrum to different extents, but only scatters to a lesser extent. In the case of illumination and observation in reflected light the color layer itself thus in particular does not reflect or reflects only to a very small extent. The color impression results from the radiation scattered back by the document substrate, which is filtered through the color layer.

However, a color layer can in particular also contain pigments which scatter strongly. This is in particular called an opaque ink. In this case, the radiation scattered back is substantially independent of the document substrate.

Color layers which represent a mixed form are likewise possible and are usually called translucent.

Inks are generally described by the hue, their lightness and saturation, which can be represented with coordinates in a three-dimensional color space, e.g. RGB or Lab. In the case of the Lab color space the colors green and red lie opposite each other on the a axis, with yellow and blue on the b axis, and L describes a lightness value between 0 and 100. The distance between these coordinates must be large enough that a color sensor can recognize a color distance or color difference, in particular color contrast. This color distance is denoted by ΔE and is calculated according to ISO 12647 and ISO 13655 as the Euclidean distance:

$$\Delta E_{p,v} = \sqrt{(L_p^* - L_v^*)^2 + (a_p^* - a_v^*)^2 + (b_p^* - b_v^*)^2}$$

$L_p$, $a_p$, $b_p$ stand for the color value of one color value, $L_v$, $a_v$, $b_v$ for the color value of another color value, forming the color distance ΔE. A color distance ΔE should be greater than or equal to 3, preferably greater than or equal to 5, further preferably greater than or equal to 6.

Further color spaces are, for example, Luv or HSV. In the image analysis for the feature recognition and image segmentation, the HSV color space is preferably used, which is derived from the RGB color space. Here, H stands for hue, S for saturation and V for value (intensity), which are arranged in a cylindrical coordinate system. The hue here is arranged in the circle and the position of a hue is indicated in degrees. To recognize a color deviation, for example from green, the hue H must deviate from the defined setpoint value in a 360° hue circle by at least 10°, preferably at least 20°, further preferably at least 30°, with a tolerance range of 20°, preferably 40°, further preferably 60°. The saturation S has a value of at least 100, in particular at least 75, preferably at least 50, in a preferred value range of from 0 to 255. The saturation S is particularly preferably at least 39%, in particular at least 29%, particularly preferably 19.5%, of a value range. The value (intensity) V has a value of at least 70, in particular between 70 and 120, preferably between 80 and 130, in a preferred value range between 0 and 256. The value (intensity) V is particularly preferably at least 27%, in particular between 27% and 47%, further preferably between 31% and 51%, of a value range.

Further, it is also advantageous if the contrasts and/or color distances, in particular color contrasts, between the image elements and the background region of a security feature in a first of the spectral ranges differs sufficiently from the contrast or color distance in a second of the spectral ranges, in particular differs by at least 5%, preferably by at least 10%. A separate recognizability of the security feature by the reading device is hereby improved and an improved detection of forgeries is thereby guaranteed.

The image elements and the background regions of the security element preferably have a difference in the reflection and/or transmission of more than 5%, in particular more than 10%, and in particular are between 15% and 100%, preferably 25% and 100%, in the first, second, third and/or fourth spectral range.

The maximum captured scope of the lightness values in particular comprises 256 lightness stages. In the case of another, in particular a higher, resolution the number of lightness stages available can change.

The contrast, in particular the lightness and/or color contrast, between image elements and background region in at least one of the first, second, third and/or fourth spectral ranges in reflected light and/or transmitted light is advantageously greater than or equal to 5%, preferably 8%, further preferably 10%. The contrast, in particular the lightness and/or color contrast, between image elements and background region in at least one of the first, second, third and/or fourth spectral ranges in reflected light and/or transmitted light can however also be smaller than or equal to 95%, preferably 92%, further preferably 90%.

A security feature of the optical security element or at least an image element is preferably formed by a partially shaped metal layer, preferably by a metallic reflective layer. The partially shaped metal layer preferably consists of Al, Cu, Cr, Ag, Au or alloys thereof. The metal layer can be applied by means of printing, for example of a printing substance having one or more metallic pigments, and/or sputter deposition and/or thermal vapor deposition. The partial metallization is advantageously produced by partial printing and/or etching and/or by a lift-off process, in particular using a soluble varnish as resist, and/or a photolithographic method. The partial metal layer can, however, also be produced in particular by local removal by means of a laser. The partially shaped metal layer can also be a partial element of an RFID component (RFID=Radio-Frequency IDentification), for example an antenna made of copper.

A partially shaped metallization is in particular clearly recognizable under IR illumination and can thus be correlated with the other regions. In addition, there is also the possibility that particular structures, in particular matte structures with an HRI layer (HRI=High Refractive Index), are arranged in the background and these are recognizable under IR or VIS illumination and thus can preferably be used as reference in order to carry out an authenticity check. Particular structures can in particular also be arranged in the region of the metallization, with the result that they are preferably also recognizable under IR or VIS illumination and thus can be used as reference.

It is likewise possible to use a metallic reflective layer and an HRI layer in combination.

At least one security feature of the optical security element or an image element is advantageously formed by a color layer. A high recognition reliability can hereby be achieved.

It is advantageous if the color layer in the first spectral range is formed substantially transparent in the first, second, third and/or fourth spectral range. For this, the color layer preferably has a transmittance of at least 50%, in particular of more than 80%, ideally of more than 90%, in the respective spectral range.

The color layer can have a transmittance in the second spectral range of at most 50%, in particular of at most 25%. It is to be borne in mind here that these values can also relate only to a partial range of the second spectral range. Thus, in particular, the VIS range is broad-band and is preferably detected as an RGB image by a color camera.

Furthermore, it is also possible that the color layer is formed or appears luminescent. The color layer ideally consists of several inks.

The color layer can be excited by radiation of the second and/or third spectral range, in particular under UV illumination and/or VIS illumination. It is advantageous if the color layer is formed such that a color impression is recognizable under different illuminations, for example under VIS and/or UV.

The color layer can be a partially shaped color layer. It is also conceivable that the color layer consists of a base varnish with admixed dyes and/or pigments. Furthermore, the color layer can have optically variable pigments and/or magnetically detectable pigments. The color layer can be both dried on a solvent basis and/or thermally dried and cured by means of UV radiation and/or chemically cured.

The color layer can preferably be inserted as an etch resist. For this, they are based in particular on the basis of PVC and/or PVAC (polyvinyl acetate) copolymer, wherein they preferably have dyes and/or pigments, in particular multi-colored or achromatic pigments and/or effect pigments.

The color layer can be deposited by means of a usual printing method. Offset, screen, gravure, pad, intaglio and/or letterpress printing can be used to apply the ink. Furthermore, it can also be applied by means of a digital printing method, in particular by means of inkjet printing or by means of a toner and/or a liquid toner.

At least one security feature can preferably also have features or properties which become recognizable or visible in particular in the UV range or by means of UV illumination. These features bring in particular a further level to the checking, whereby the capacity of the automated inspection can be better utilized.

The security feature of the security element can be formed by a relief structure and a reflective layer, wherein the relief structure deflects the incident radiation in a predefined manner in particular in at least one of the spectral ranges. It is advantageous if the reflective layer is or appears transparent or substantially transparent in at least one of the spectral ranges, i.e. has a transmittance of more than 50%, preferably of more than 70%, and/or has a reflectance of less than 50%, preferably of less than 30%. The reflective layer is preferably formed by an HRI layer, in particular a layer made of ZnS (zinc sulfite) and/or $TiO_2$ (titanium dioxide).

The relief structure is preferably formed by a relief structure with optically variable properties and/or comprises one or more of the following relief structures: diffractive grating, asymmetric diffractive structure, isotropic matte structure, anisotropic matte structure, blazed grating, zero-order diffractive structure, light-refractive and/or focusing structures, in particular microprisms, microlenses. A particularly reliable verification of the security feature and thus also of the document can be guaranteed hereby.

The relief structure is advantageously by a diffraction structure which diffracts the incident electromagnetic radiation in one of the first, second, third and/or fourth spectral ranges in a predetermined manner in such a way that part of the radiation is incident in the at least one detector, and yet electromagnetic radiation is not or is substantially not incident in at least one detector in another of the first, second, third and/or fourth spectral ranges.

The diffraction structure is advantageously formed by a zero-order diffraction structure for the at least one spectral range. The period of the diffraction structure preferably lies below the wavelength of the visible range. In particular it is 500 nm or smaller. The diffraction structures ideally have a color effect typical of them in the visible light range.

The structure preferably scatters or diffracts into the at least one detector both under VIS illumination and under IR illumination.

To determine the relative shaping of the first and second security features, the shaping of image elements of the first and second security features is preferably checked for whether the image elements are arranged register-accurate relative to each other, in particular whether image elements formed as lines merge into each other in a positionally accurate manner and/or match in relation to their incline.

According to the invention, the image elements can be, among other things, graphically designed outlines, figurative representations, images, visually recognizable design elements, symbols, logos, portraits, patterns, alphanumeric characters, text, colored designs, etc.

The data sets are preferably the raw images of the first region and/or the security elements and/or security features or their image elements, which the reading device records in the respective spectral range. They can in particular be grayscale images or color images. A grayscale image can in particular comprise one or more, preferably all, color channels and/or the hue of an image.

The first, second, third and/or fourth data set is preferably subjected to an image processing.

In the following, different image-processing steps are described which are preferably used to analyze the data sets and in particular to check the authenticity of the security document and/or the security element on the basis of the first and second data set. The different steps can be combined with each other depending on the use, and one can sometimes require another.

The basis of the image analysis is in particular an image-preparation step in which the image is adapted and pre-processed for a characteristic recognition, in particular feature recognition, and image segmentation.

By feature is preferably meant a distinctive or interesting point of an object or image element, in particular a corner or an edge. The point can be described in particular with reference to its periphery and can thus be clearly recognized or found again.

A preferred step is the conversion of the raw images preferably into a grayscale image. In the case of a grayscale image, each pixel or image point preferably consists of a lightness value between 0, which is allocated to the color black, and 255, which is allocated to the color white. If the image has only a small range of lightness values, then the image lightness can be transformed by multiplying for example the lightness value of each pixel by a factor or by carrying out a histogram comparison. For the processing of color images, the color channels of each image point are preferably first converted into a grayscale value or a lightness value.

For a first position determination, the available grayscale image is preferably analyzed by means of template matching (template matching step).

By template matching applications is meant in particular algorithms which identify parts of an image or motif, in particular image elements of a security feature which 30 correspond to a predefined image or motif, the template. The template is preferably stored in a database. The image elements or image objects are preferably checked image point by image point for a match with a reference image or reference motif. If the number of points, i.e. the image points and/or reference points, is very large, the number of reference points can be reduced, in particular by reduction of the resolution of the motifs or images. The aim of the algorithm is to find and locate the highest match of the reference image or reference motif within the respective data set.

The grayscale images are advantageously binarized with a thresholding in an image pre-processing step.

One or more threshold values are advantageously determined via an algorithm, in particular the k-means algorithm. Here, the object of the k-means algorithm is a cluster analysis wherein pixels with a lightness value below one or more threshold values are preferably set to black and all others are set to white. The determination of a black image is in particular carried out by means of the following steps: comparison of the lightness values of the image point data of the allocated data set with a first threshold value, wherein all image points which lie below the first threshold value are allocated the binary value 0, in particular they are set to black. The definition of the threshold value is effected n particular on the basis of information with respect to the recognized feature or document type, which is stored in a first region of the security document and/or security element.

The first threshold value is advantageously smaller than 20% of the value range in the UV range as allocated spectral range. In particular, the first threshold value is smaller than 40 in the case of a value range of from 0 to 255.

In the IR range as allocated spectral range, the first threshold value is preferably smaller than 25% of the value range, in particular the first threshold value is smaller than 60 in the case of a value range of from 0 to 255.

A white image is preferably determined from the allocated data set by calculation of a constant binary image. To determine the white image, the following steps in particular can be carried out comparison of the lightness values of the image point data of the allocated data set with a second threshold value, wherein all image points which lie above the second threshold value are allocated the binary value 1, in particular they are set to white.

In the UV range as allocated spectral range, the second threshold value is advantageously greater than 5% of the value range, in particular the second threshold value is greater than 20 in the case of a value range of from 0 to 255.

In the IR range as allocated spectral range, the second threshold value is preferably greater than 30% of the value range, in particular the second threshold value is greater than 80 in the case of a value range of from 0 to 255.

The first and second threshold values preferably differ from each other.

The difference between light and dark is preferably greater than 80 in the IR range, in particular in the case of an IR image, and greater than 20 in the UV range, in particular in the case of a UV image.

To calculate the edge image, a threshold algorithm, in particular an adaptive threshold algorithm with a large block size, can be applied to the allocated data set. The adaptivity of the threshold algorithm here relates in particular to one or more regions of the image and/or one or more pixels of the image. This incorporates local changes in the background lightness into the calculation. It can thereby be ensured that the edges present are correctly recognized.

To produce the threshold image, the following calculations are carried out:
  calculation of an edge image from the allocated data set,
  calculation of a black image from the allocated data set,
  calculation of a white image from the allocated data set.

The steps can be carried out in the sequence indicated or in a sequence deviating therefrom. Furthermore, the calculation of the threshold image is effected by combining the edge image, the black image and the white image.

An edge image is preferably first multiplied by the black image on the image point or pixel level. All black regions of the black image are hereby now also black in the edge image. A black edge image is thus obtained. In a further step the white image is to added to the black edge image. All image points or pixels which are white in the white image are hereby now also white in the black edge image. As a result, a finished threshold image is obtained.

The first and/or the second threshold value can be set depending on the recognized document types, on the recognized illumination and/or the spectral range. It is hereby possible to adapt the threshold value precisely to the respective situation and thus to be able to carry out the best possible check.

The reverse procedure is likewise conceivable. The color channels can originate from different color spaces, for example the RGB color space or the HSV color space.

The threshold images present can be further pre-processed and/or segmented in further image-processing steps for a recognition of image details by means of different filters.

If filters are used, in particular the image points are manipulated depending on the neighboring pixels. The filter preferably acts like a mask, in which in particular the calculation of an image point depending on its neighboring image points is indicated.

A lowpass filter is advantageously used. The lowpass filter in particular ensures that high-frequency or high-contrast value changes, such as for example image noise or hard edges, are suppressed. The imaging of the security feature into the respective data set is hereby in particular faded, or blurred, and appears less sharp. For example, locally large contrast differences are thus mutated into locally small contrast differences in each case, e.g. a white pixel and a black pixel neighboring each other become two differently gray or also identically gray pixels.

Furthermore, bilateral filters can also be used. This is a selective soft-focus lens or lowpass filter. In particular, planar regions of the security element with average contrasts are shown in soft focus, but at the same time strongly contrasting region or motif edges are obtained. In the selective soft-focus picture, lightness values of image points from the proximity of a starting image point are preferably integrated into the calculation depending not only on their distance but preferably also on their contrast. The median filter represents a further possibility for noise suppression. This filter also obtains contrast differences between neighboring regions, while it reduces high-frequency noise.

There is also a range of filters other than those described here, such as e.g. Sobel operator, Laplace filter or filtering within a frequency domain into which the image has previously been converted. Filtering in the frequency domain (the transformation is usually carried out with the fast Fourier transform) offers advantages such as an increase in efficiency during the image processing.

Filters and filter operations are preferably also used for edge analysis and edge detection and/or elimination of image interferences and/or smoothing and/or reduction of signal noises.

To recognize and discover image details, the pre-treated images must be split or segmented into meaningful image regions. There are various approaches for this.

The basis of a segmentation can preferably be an edge detection by means of algorithms which recognize edges and object transitions. High-contrast edges can be located within an image with different algorithms.

These include, among other things, the Sobel operator. The algorithm utilizes a convolution by means of a convolution matrix (filter kernel) which produces a gradient image from the original image. With these, high frequencies in the image are represented with grayscale values.

The regions of the greatest intensity are where the lightness of the original image changes most strongly, and thus represents the largest edges. The direction of progression of the edge can also be determined with this method.

The Prewitt operator, which, in contrast to the Sobel operator, does not additionally weight the observed image rows or image columns, works in a similar way.

If the direction of the edge is not relevant, the Laplace filter, which approximates the Laplace operator, can be applied. This forms the sum of the two pure or partial second derivatives of a signal.

If only exact pixel edges are sought and not the strength of the edge, then the Canny algorithm, which marks contours, is useful.

A further segmentation is preferably effected by means of feature detectors and feature descriptors, wherein preferably the Accelerated-KAZE (A-KAZE) algorithm (kaze=Japanese for wind) is applied. A-KAZE is in particular a combination of feature detector and feature descriptor.

Preferably, in a first step, distinctive points in the objects or image elements of the reference image, which is preferably stored in a database, and the image elements to be verified are sought by means of the A-KAZE detector on the basis of several different image filters. These points are described by the A-KAZE descriptor in particular with reference to their surroundings. A feature described with the A-KAZE descriptor advantageously consists of an encoded, but clear data volume, in particular with a defined size or length and/or the coordinates.

A feature matcher, preferably a brute-force matcher, then advantageously compares the descriptions of the features to be compared in the two objects or image elements and forms pairs of features the descriptions of which almost or completely match. From this comparison, a result value can then be calculated which is a measure of the match of the two features. Depending on the size of the result value, a decision as to whether the features are sufficiently similar or not is possible.

Depending on the matching method, an upstream preselection or alternatively a point-for-point analysis, which can however be very time-consuming, can also take place. The transformation, thus the scaling, shift, stretching, etc., between the two images or image elements can preferably be calculated from the compatible features. In principle, however, it is also conceivable that the BRISK algorithm (BRISK=Binary Robust Invariant Scalable Keypoints) or the SIFT algorithm (SIFT=Scale-Invariant Feature Transform) is used as the algorithm.

To approximate or come close to the shape and position of an object, preferably enveloping bodies, in particular envelope curves, are used in a further image-processing step.

In the simplest case, this can be a bounding box, an axis-parallel rectangle, in particular a square, which surrounds the object. A bounding rectangle can likewise be used which, in contrast to the bounding box, need not be axis-parallel, but can be rotated. Furthermore, a bounding ellipse can be used. A bounding ellipse can approximate round objects, in particular objects having a curvature, better than a rectangle, and is defined via the center point, radius and angle of rotation. More complex bodies can be approximated by means of a convex envelope or an enveloping polygon. However, the processing of these objects requires much more computation time than in the case of simple approximations. For the sake of the computational outlay, in each case an object which is as simple as possible is therefore used here.

One or more of the following steps are preferably carried out in order to check the authenticity of the security document and/or security element on the basis of the data sets generated, in particular the first, second, third and/or fourth data set:

1. Conversion of one or more of the raw images preferably into one or more grayscale images and/or color images, and thresholding, in particular calculation of one or more threshold images, and/or color preparation.
2. Comparison of individual images, in particular raw, grayscale, color and/or to threshold images with one or more templates for the verification preferably by means of template matching.
3. Edge detection in one or more of the images in each case, in particular raw, grayscale, color and/or threshold images.
4. Finding the position of one or more objects in one or more of the images in each case, in particular in raw, grayscale, color and/or threshold images, via enveloping bodies and/or segmentation and/or recognition of one or more of the objects in each case by means of one or more feature detectors and/or feature descriptors.
5. Comparison of one or more grayscale values and/or color values in each case of one or more of the images, in particular raw, grayscale, color and/or threshold images, with grayscale values and/or color values stored in a database.
6. Comparison of two or more of the images, in particular two or more of the raw, grayscale, color and/or threshold images, to which in each case one or more, in particular all, of the steps 1 to 5 have been applied. Comparison of the shifts of one or more of the objects in individual images, in particular in raw, grayscale, color and/or threshold images, in each case by means of one or more bounding boxes or similar further methods.
7. Comparison of the lightness values of in each case one or more of the superimposed images, in particular superimposed raw, grayscale, color and/or threshold images, and one or more possible further image analyses.

Advantageously, a security feature, in particular a first security feature, comprises a first object consisting of one or more image elements.

The first security feature preferably has a metal layer, wherein the metal of the metal layer is provided in the region of the image elements, and no metal layer is provided in a background region surrounding the image elements. A transparent reflective layer made of a material with a high refractive index can preferably be provided in the background region surrounding the image elements.

A security feature, in particular a second or a further security feature, advantageously comprises a further, in particular a second, object consisting of one or more image elements.

The second security feature preferably has a color layer, wherein the dyes and/or pigments of the color layer are provided in the region of the image elements and the dyes and/or pigments of the color layer are not provided or are provided in lower concentration in a background region surrounding the image elements. The color layer preferably has UV-fluorescent pigments.

The first security feature consisting of a first object and the second security feature consisting of a second object preferably partially overlap.

For the check, the first object is detected by means of the first data set, in particular by detection of the metallic surface in the first spectral range, in particular in the IR range. The first object appears primarily dark in front of the lighter substrate of the security document under IR illumination. Possible diffractive design elements of the first object can influence the contrast, but only to a small extent, if the IR range is used as the first spectral range.

The first object is preferably shown in soft focus with a bilateral filter, wherein this is in particular a selective lowpass filter which leaves hard edges intact. Preferably, by means of a digital comparison of the object from the recording or of the first data set with a reference image stored in a database, in particular a so-called template matching, the metallic region is sought by using a previously stored template image. The check preferably takes place on the basis of the prior knowledge from a database in which the different possible images and necessary checks are described by the developer of the features.

Furthermore, in a further step, the second object from the second data set can be detected, in particular by detection of the color layer, in a second spectral range, in particular in the UV range or VIS range.

Advantageously, from the first data set the first object of the first security feature is detected and a reference point, in particular the center point, of the first object is calculated and from the second data set the second object of the second security feature is detected and a reference point, in particular the center point, of the second object is calculated. One or more center points, intersection points, points on edges, corner points, points on surfaces, points in volumes, local and/or global minimums and/or local and/or global maximums, in particular of one or more objects, but also quantities of the above points, such as for example straight lines, edges, variance regions, confidence intervals and/or any surfaces, in particular of one or more objects, come into consideration as reference points. Such reference point quantities can also be assembled from different proportions of the above-named reference points. The check of the authenticity of the corresponding security document and/or security element is then preferably effected through the comparison of the spacing of the calculated reference points, in particular center points, or other types of reference point of the first and second objects with a reference value. With the aid of further reference points, orientations of the objects relative to each other can also be determined, the comparison of which with reference values likewise allows a check for authenticity.

To calculate the reference point, in particular the center point, of the first and/or second object, in each case a rectangular frame is preferably calculated, which preferably borders the first or second object, in particular borders the geometric shapes of the first and/or second object as closely as possible, wherein the reference point, in particular the center point, of the rectangular frame is in particular evaluated to as a reference point, in particular as a center point, of the first or second object. The rectangular frame around the largest recognized object is preferably calculated.

Advantageously, to calculate the reference point, in particular the center point, of the first and/or second object, the first and second threshold images are first calculated and then in each case a rectangular frame is calculated or produced. The frame preferably encloses all image points of the first or second threshold image with the binary value 1. However, the frame can also lie around all image points of the first or second threshold image with the binary value 0. The reference point, in particular the center point, of the frame is in particular evaluated as reference point, in particular center point, of the first or second object. If the outer contours of the objects cannot be completely recognized, then preferably an adaptation of the algorithms is needed; in particular the feature matching image-recognition algorithm is suitable for this. With the aid of the best matching position, in particular the almost optimal position, preferably the optimal position, of a suitable template, a virtual reference point, in particular center point, of the first or second object is preferably determined.

Deviations can form because of manufacturing tolerances. However, the deviations of the rectangular frames or bounding boxes from each other should not exceed a predetermined deviation, in order to ensure a reliable verification. In particular, the maximum permissible deviation can preferably be less than ±0.8 mm, in particular less than ±0.5 mm, preferably less than ±0.2 mm, longitudinally and transversely, wherein these represent the allowed deviation of the bounding boxes from each other or from a reference.

A first security feature and a second security feature preferably overlap at least in some regions. The security element is arranged preferably above the second security feature in the case of observation from the front side of the security document. The first and second security features have in each case one or more image elements and a background region, wherein the image elements of the first security element are opaque or largely opaque in a second spectral range and in particular consist of a metal layer.

The first data set and the second data set are preferably compared for whether the image elements or one or more image elements of the second security feature in the second data set are imaged only in the region of the background region of the first security feature.

Further, it is also possible that the first and the second security elements have in each case one or more image elements and a background region, wherein the image elements of the second security element are transparent or largely transparent in the first spectral range, but have a contrast, in particular the lightness and/or color contrast, between image element and background element of more than 5%, preferably 8% and further preferably 10%, in the second spectral range.

The position and shaping of one or more image elements of the second security feature are preferably determined from the second data set, in particular by calculation of a second threshold image. Furthermore, the position and shaping of one or more image elements of the first security feature are determined from the first data set, in particular by calculation of a first threshold image. In a further step, key points, such as end points, of the image elements of the first and second security features are determined and on the basis thereof a check is made as to whether according to given reference values image elements of the first and second security features are positioned register-accurate relative to each other and/or merge into each other and/or match with respect to their incline.

It is further possible that the first security feature comprises a partial metal layer and a diffractive structure. The second security feature comprises a partial color layer, wherein the material of the metal layer or of the color layer is provided in one or more image elements of the first and second security features and is not provided in a background region surrounding the image elements. The image elements of the metal layer and of the color layer are preferably shaped congruent with each other. The diffractive structures are further preferably designed such that they diffract radiation of the second spectral range, in particular of the VIS range, into a sensor of the reading device, but do not diffract radiation of the first spectral range, in particular of the IR range, into the sensor of the reading device.

The above-specified identical formation of the metal layer and the color layer of the first or second security feature is preferably achieved in that the color layer is used as an etch resist for the partial demetallization of the metal layer in the production of the security element. A further preferred variant is to use a color print which is opaque in particular for the respective exposure wavelength, preferably an absorbing and/or translucent ink, as a mask for a photolithographic structuring of the metal layer. The thus-generated register-accurate structure of these two layers can be correspondingly detected using the above-described method, and used to check the authenticity of the security document.

One or more of the following measures can be implemented in any combination in order to check in particular the authenticity of the security document, in particular information regarding the authenticity of the security document:

The first security feature comprises a partial metal layer and the second security feature comprises a partial color layer, wherein the material of the metal layer or color layer is provided in one or more image elements of the first security feature and of the second security feature and is not provided in a background region. Several image elements of the color layer are shaped in the form of a machine-readable code, in particular a QR code. The metal layer is demetallized using a first mask layer, which is shaped in the form of a first item of information, and using a second mask layer, which is formed by the color layer. It is hereby achieved that the image elements of the metal layer no longer contain the complete first item of information. During the check, in each case the image elements of the first and second security features are determined from the first and second data set and compared for whether the check of the combination of the respective image elements from the first and the second security feature yields the complete first item of information.

In the same way as described above, the security feature of the security element, and also security features of the security document which are arranged in the first region, in particular overlapping one or more security features of the security element, can be detected from the generated data sets, in particular the first, second, third and/or fourth data set. These security features of the security document and/or substrate can then, in the same way as described above with respect to the security features of the security element, be used in particular also in the determination of corresponding relative values for security features of the security element to check the authenticity of the security document.

Further it is also possible for one or more of the security features of the security element and/or security document to contain items of individualized or personalized information, for example by partial removal of a metal layer of the respective security feature by means of a laser or by an overprint in ink which fluoresces under UV irradiation. This individualization or personalization can additionally, by comparisons with further items of information which both from the detected data sets and from a database which the reading device accesses, be used to check the authenticity of the security document.

If the security element has a security feature comprising a color layer, then the following steps are preferably further carried out to check the authenticity of the security document:

determination of one or more parameters of the color layer, selected from position, color, ink coverage, reflection, orientation, size, shape, personalization, color change and electromagnetic properties, in particular on the basis of one or more of the first, second, third and fourth data sets, wherein a comparison of the determined one or more parameters with predefined allocated reference values is preferably effected and a denial of the authenticity is effected if the deviation exceeds a predefined to tolerance range.

If the security element has a security feature comprising a metal layer, then the following steps are preferably further carried out to check the authenticity of the security document:

determination of one or more parameters of the metal layer, selected from position, reflection, color, orientation, size, shape, personalization, area coverage, transmission, in particular on the basis of one or more of the first, second, third and fourth data sets, wherein a comparison of the determined one or more parameters with predefined allocated reference values is preferably effected and a denial of the authenticity is effected if the deviation exceeds a predefined tolerance range.

If the security element has a security feature comprising an antenna, then the following steps are preferably further carried out to check the authenticity of the security document:

determination of one or more parameters of the metal layer or antenna structure, selected from position, electromagnetic properties, design, color, in particular on the basis of one or more of the first, second, third and fourth data sets, wherein a comparison of the determined one or more parameters with predefined allocated reference values is preferably effected and a denial of the authenticity is effected if the deviation exceeds a predefined tolerance range.

If the security document underneath the security element has a document background comprising a metal layer and/or color layer, then the following steps are preferably further carried out to check the authenticity of the security document: determination of one or more parameters of the metal layer and/or of the color layer, selected from position, color, ink coverage, reflection, orientation, size, shape, electromagnetic properties, personalization and area coverage, in particular on the basis of one or more of the first, second, third and fourth data sets, wherein a comparison of the determined one or more parameters with predefined allocated reference values is in particular effected and a denial of the authenticity is effected if the deviation exceeds a predefined tolerance range.

If the security element has a security feature comprising an RFID chip, then the following steps are preferably further carried out to check the authenticity of the security document:

reading of one or more items of information stored on the RFID chip, which include in particular a specification of one or more security features of the security element and/or code stored in these, checking of the security document on the basis of the read items of information, in particular for whether one or more security features of the security element correspond to the read specifications and/or include the read code.

If the security element has a security feature comprising at least one diffractive and/or refractive structure, then the following steps are preferably further carried out to check the authenticity of the security document:

determination of one or more parameters of the diffractive and/or refractive structure, selected from position, reflection, scattering, gloss, arrangement of the design elements of the diffractive and/or refractive structure, in particular on the basis of one or more of the first, second, third and fourth data sets, in particular comparison of the determined one or more parameters with predefined allocated reference values and denial of the authenticity if the deviation exceeds a predefined tolerance range.

If the security element has a security feature comprising a self-luminous structure, such as for example an OLED or a luminescent layer, then the following steps are preferably further carried out to check the authenticity of the security document: determination of one or more parameters of the self-luminous structure, selected from luminescence when excited, color when excited, position of the elements of the self-luminous structure, in particular on the basis of one or more of the first, second, third and fourth data sets, in particular comparison of the determined one or more parameters with predefined allocated reference values and denial of the authenticity if the deviation exceeds a predefined tolerance range.

If the security document has a document body with several layers and/or a window and/or a through-hole region, then the following steps are preferably further carried out to check the authenticity of the security document: determination of one or more parameters of the document body, selected from window position, window shape, position of the layers relative to each other, in particular on the basis of one or more of the first, second, third and fourth data sets, in particular comparison of the determined one or more parameters with predefined allocated reference values and denial of the authenticity if the deviation exceeds a predefined tolerance range.

A verification in a region of the security feature of the security document can be reliably carried out due to the presence of a plurality of features to be checked, whereby a reliable statement with respect to the authenticity of the document can be made, i.e. there is a high probability or confidence of the authenticity of the document. The individual checkable features can in principle be combined with each other. The individual features can advantageously be correlated with each other relatively. It is conceivable for example that the position of a first image element is correlated with the position of a second image element, or that their orientations or sizes are correlated with each other. The color of a first image element or object under VIS illumination can also be correlated with the color or lightness of the first image element under IR illumination.

It is advantageous if an item of information about the authenticity of the security element or of the security document is output by the reading device. This can be effected both visually and acoustically and/or electronically.

The document can be an identification document, a travel document, an identity card, a passport booklet, a visa, a security, a banknote, a certificate, etc. The document or at least the page to be checked, such as for example the data page in a passport, or a page with a visa sticker, preferably has a single-layered or multi-layered substrate. The substrate is preferably present in the form of a card or a data page made of paper and/or plastic. In particular, the substrate is made of a plastic, preferably made of PVC, ABS, PET, PC, Teslin or combinations (multi-layer composite) thereof. It is also conceivable that the substrate is made of paper or a textile material. The substrate can have a transparent region and/or an opening.

The performance of the method according to the invention can further also comprise the provision and/or production of a security document which is designed as set out above and/or a security element which is designed as set out above.

The sensor equipment of the device preferably has one or more sensors and/or one or more radiation sources. Preferably, different radiation sources and/or sensors are allocated to the first and to the second spectral range. The sensor equipment ideally comprises one or more radiation sources which emit or detect visible light, UV light and/or IR radiation.

Furthermore, the sensor equipment can be designed in such a way that, in addition to the spectral range, the illumination directions and/or the observation directions can also be varied. Thus, for example, an illumination in the VIS range can be effected from different directions or direction ranges, which result in several data sets for the same spectral range. Thus, for example, disruptive reflections can be avoided.

It is also conceivable that the device has at least one laser diode and/or an LED. Preferably, a piece of software evaluates the signals obtained by the device. The software can be directly in the device or also on a connected PC or another external device, such as for example a smartphone or a server.

BRIEF DESCRIPTION OF THE DRAWINGS

The invention is explained by way of example below by means of several embodiment examples with the aid of the attached drawings. There are shown in:

FIGS. 6a, 6b, 6c, 6d schematic representation of a security feature when observed in different spectral ranges FIGS. 7a, 7b, 7c schematic representation of a security document with security element designed in some regions FIGS. 8a, 8b, 8c, 8d, 8e schematic representation of a security feature shaped as a QR code when observed in different spectral ranges FIG. 9 schematic representation of a security feature with individual markings shaped therein

DETAILED DESCRIPTION OF THE PREFERRED EMBODIMENTS

Figure 1A:
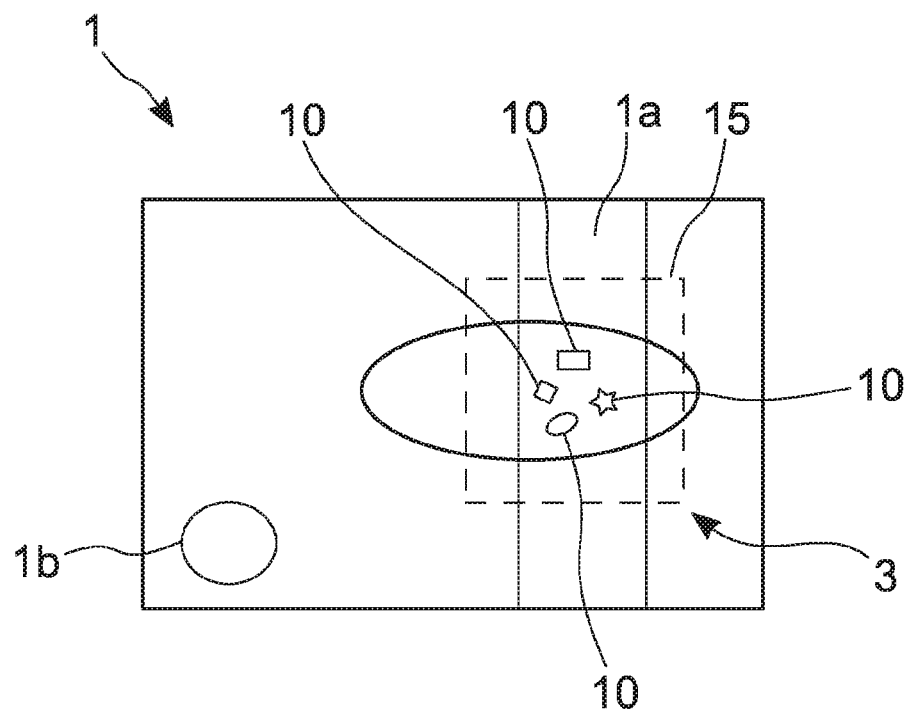
FIGS. 1a, 1b show schematic representations of a security document
Figure 1B:
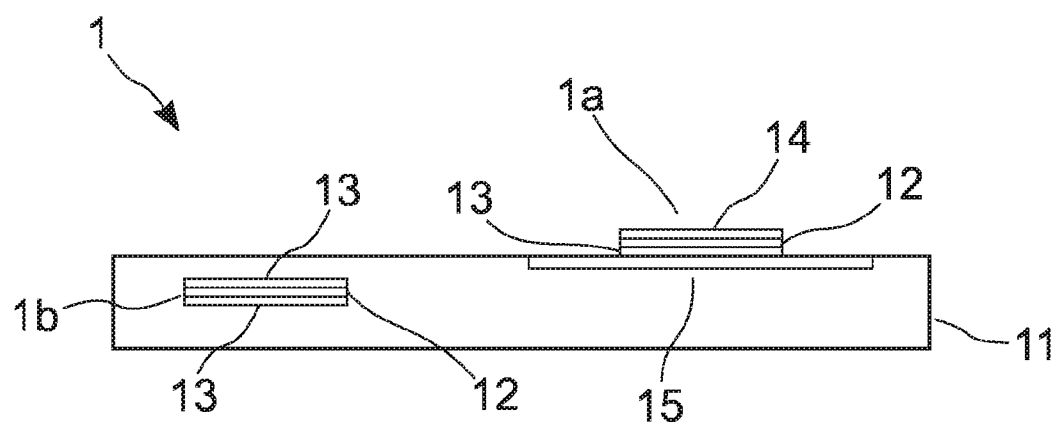

FIGS. 1a and 1b illustrate by way of example the structure of a security document 1.

FIG. 1a shows the security document 1 in top view and FIG. 1b shows it in cross section.

The security document 1 preferably consists of an ID document, for example a passport, a passport card, an access card. However, it can also be a further security document 1, for example a banknote, security, a certificate or a credit card or bank card.

The security document 1 has a document body 11 and one or more security elements, of which two security elements 1a, 1b are shown in FIGS. 1a and 1b.

The security elements can here be applied to the document body 11 of the security document 1, or be embedded in the document body 11 of the security document 1, in particular be completely or partially embedded.

The document body 11 of the security document is preferably formed multi-ply and in particular comprises a carrier substrate, which is formed by a paper substrate and/or plastic substrate. Further, the document body 11 can also comprise one or more protective layers, one or more decorative layers and/or one or more security features. Regarding this, FIG. 1*b* shows by way of example a security feature 15 of the security document 1, which at least partially overlaps the region 3 or at least in some regions overlaps the region 3 of the security document 1, to which the security element 1*a* is applied. The document body 11 here preferably also comprises an electronic circuit, in particular an RFID chip, in which information is stored.

The one or more security elements, in particular the security elements 1*a*, 1*b*, preferably consist in each case of an element which is manufactured independently of the production of the document body 11 and is applied to the document body 11 or embedded in the document body 11 only during the production of the security document. The security elements 1*a*, 1*b* are in particular formed by transfer plies of a transfer film, a laminating film and/or a film element, in particular in the form of a security thread. The security elements here can cover a surface of the security document over the whole surface and/or cover it only partially, for example be formed in strip or patch form, as is shown with respect to the security elements 1*a*, 1*b* in FIG. 1*a*.

The security elements, in particular the security elements 1*a*, 1*b*, here preferably have a protective layer 14, a decorative layer 12 and an adhesive or adhesion-promoting layer 13. Thus, for example, the security element 1*a* is formed as the transfer ply of a transfer film, which comprises a protective layer 14, a decorative layer 12 and an adhesive layer 13 and is applied to the front side of the document body 11, as shown in FIG. 1*a*.

The security element 1*b* is formed as a film element comprising two adhesion-promoting layers 13 and a decorative layer 12, has a patch form and is embedded in the inside of the document body 11 during the production of the document body 11, as shown in FIG. 1*b*.

The decorative layers 12 of the security elements 1*a*, 1*b* in each case form one or more security features, which are preferably also optically visible to the human observer. FIG. 1*a* shows by way of example four security features 10, which are provided by the decorative layers 12 of the security element 1*a*, 1*b*. Here, preferably, each of the security features 10 is formed or provided by one allocated layer or several allocated layers of the decorative layer 12.

Thus, the decorative layers 12 have, for example, one or more of the following layers:

The decorative layer 12 preferably has one or more metallic layers, which are preferably in each case provided in the security element not over the whole surface, but only partially. The metallic layers here can be formed opaque, translucent or partially transparent. The metallic layers here are preferably formed of different metals, which have markedly different reflection and/or transmission spectra. For example, the metal layers are formed of aluminum, copper, gold, silver, chromium, tin or an alloy of these metals. Furthermore, the metallic regions can be designed rasterized and/or with locally different layer thicknesses.

The one or more metal layers here are preferably structured patterned in such a form that they comprise one or more image elements, in which the metal of the metal layer is provided, and comprise a background region, in which the metal of the metal layer is not provided. The image elements here can preferably be formed as alphanumeric characters, but also as graphics and complex representations of objects.

Further, it is also possible that the dimensions of the image elements in at least one lateral direction are less than 300 µm, preferably less than 200 µm, further preferably less than 50 µm. It is hereby possible to conceal the structuring of the respective metal layer from the human observer, but still to guarantee a machine detectability.

The decorative layer 12 can further comprise one or more color layers, in particular inks. These color layers are preferably color layers which are applied by means of a printing method, and which have one or more dyes and/or pigments which are incorporated in a binder matrix. The dyes and/or pigments here have an absorption/reflection spectrum and/or an absorption/reflection behavior which preferably differs, in particular differs markedly, in different spectral ranges detected by the reading device. However, they can also differ within one spectral range, such as for example in the VIS range. The color layers, in particular inks, can be transparent, clear, partially scattering, translucent or non-transparent or opaque.

Dyes and/or pigments which are detectable in the IR range, for example in the near infrared range of from 800 nm to 1000 nm, which are detectable in the VIS range, such as for example the usual printing inks, and/or which are detectable in the UV range, i.e. in particular absorb UV light and/or have UV-luminescent properties, are preferably used as dyes and/or pigments. Photochromic substances which are activated in the UV range and then become visible in the VIS range can also be used as dyes and/or pigments.

The one or more color layers here preferably in each case comprise one or more image elements in which the dyes and/or pigments of the color layer are provided and a background region in which the pigments or dyes of the color layer are not provided or are provided in lower concentration.

The decorative layer 12 preferably has two or more color layers, in which the image elements are shaped differently and/or the pigments and/or dyes of the color layer have different reflection and/or absorption properties, in particular in the first, second, third and/or fourth spectral range.

The decorative layer 12 preferably has one or more optically active relief structures, which are preferably in each case introduced into the surface of a replication varnish layer. These relief structures are preferably diffractive relief structures, such as for example holograms, diffraction gratings, diffraction gratings with symmetrical or asymmetrical profile shapes, zero-order diffraction structures. These relief structures can also be isotropically and/or anisotropically scattering matte structures, blazed gratings and/or relief structures acting substantially in reflection and/or transmission such as microlenses, microprisms or micromirrors.

The decorative layer 12 further preferably has one or more interference layers which reflect or transmit the incident light in a wavelength-selective manner. These layers can be formed for example by thin-film elements, in particular Fabry-Pérot thin-film elements, which generate a viewing angle-dependent color shift effect, based on an arrangement of layers which have an optical thickness in the region of a half or λ/2 wavelength (λ is the wavelength of the light or the wavelength of an electromagnetic wave) or a quarter or λ/4 wavelength of the incident light. Constructive interference in an interference layer with a refractive index n and a thickness d is calculated as follows:

$$2nd\cos(\Theta) = m\lambda,$$

wherein Θ is the angle between the illumination direction the observation direction, λ is the wavelength of the light and m is an integer. These layers comprise a spacer layer, in particular arranged between an absorption layer and a reflective layer or can preferably be formed by a layer comprising thin-film pigments.

The decorative layer can further preferably have one or more liquid crystal layers, which on the one hand generate a reflection and/or transmission of the incident light dependent on the polarization of the incident light and on the other hand also generate a wavelength-selective reflection and/or transmission of the incident light, depending on the direction of the liquid crystals.

As shown in FIG. 1a, a first region 3 of the security document, which overlaps the security element 1a at least in some regions, is detected by a reading device 2. The security element 1a preferably comprises one or more security features, which in FIG. 1a are formed by the security features 10, in the first region 3.

Further, it is also possible that the first region 3 overlaps with one or more security features of the security document 15, as is illustrated by way of example in FIG. 1a the security feature of the security document 15. The security feature of the security document 15 here is preferably formed correspondingly, as described above with respect to the security features 10 of the security element.

Further, it is also possible that, in addition to the first region, another one or more second and third regions of the security document 1, which overlap the security element 1b for example, are encompassed by the reading device. The entire surface of the document can in particular also be detected.

Figure 1C:
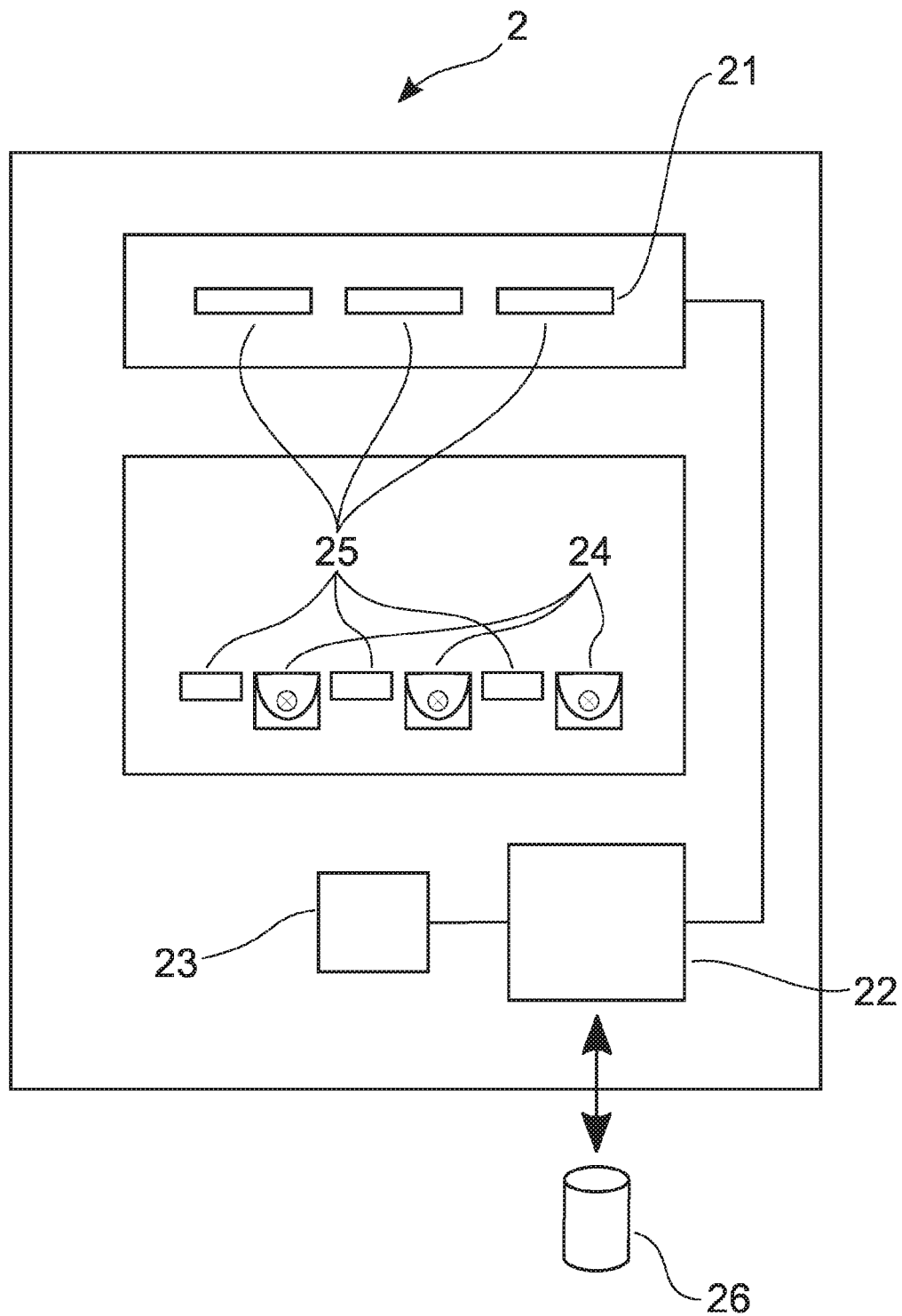
FIG. 1c shows a schematic representation of a reading device

FIG. 1c schematically shows the structure of a reading device 2, which can be used to check the security document 1. The reading device 2 has a piece of sensor equipment 21, a piece of analysis equipment 22 and a piece of output equipment 23. The sensor equipment 21 preferably has one or more radiation sources 24 and one or more sensors 25.

Thus, the sensor equipment 21 preferably has three or more radiation sources 24, which in each case emit radiation with a different spectral composition, in particular emit light from a UV range, a VIS range or an IR range. The sensor equipment 21 preferably has one or more sensors 25, which are set up to detect radiation from different spectral ranges or wavelength ranges, for example by upstream connection of corresponding band filters and corresponding selection of the image sensors, wherein one or more of the sensors 25 can preferably in each case detect one or more spectral ranges. These sensors are preferably image sensors, further preferably cameras, in particular preferably detectors, which can in particular record an image with a minimum resolution of 350 ppi, in particular 400 ppi, preferably 500 ppi, along the horizontal and/or vertical axis.

The sensor equipment 21 here preferably has, for example shown in FIG. 1c, sensors 25, which are arranged on different sides of a piece of feed equipment for a value document in order to be able to detect the transmission and/or reflection spectrum both when observed in reflected light from the front and rear side and when observed in transmitted light.

The analysis equipment 22 evaluates the data sets generated by the sensor equipment 21 and preferably comprises hardware and/or software components which carry out the performance of the evaluation steps described for this in the following. Here, it is also possible that the analysis equipment 22 accesses an external database 26.

Further, the reading device 2 preferably comprises a piece of output equipment 23, which outputs the result of the authenticity check to the operator optically, acoustically, haptically, electronically and/or in another way.

In addition to the above-described sensors 25, the reading device 2 can also comprise further sensors 25 for the machine detection of data of the security document, for example an RFID reading device, as well as sensors 25 for the detection of electrical and/or magnetic security features of the security document.

Figure 1D:
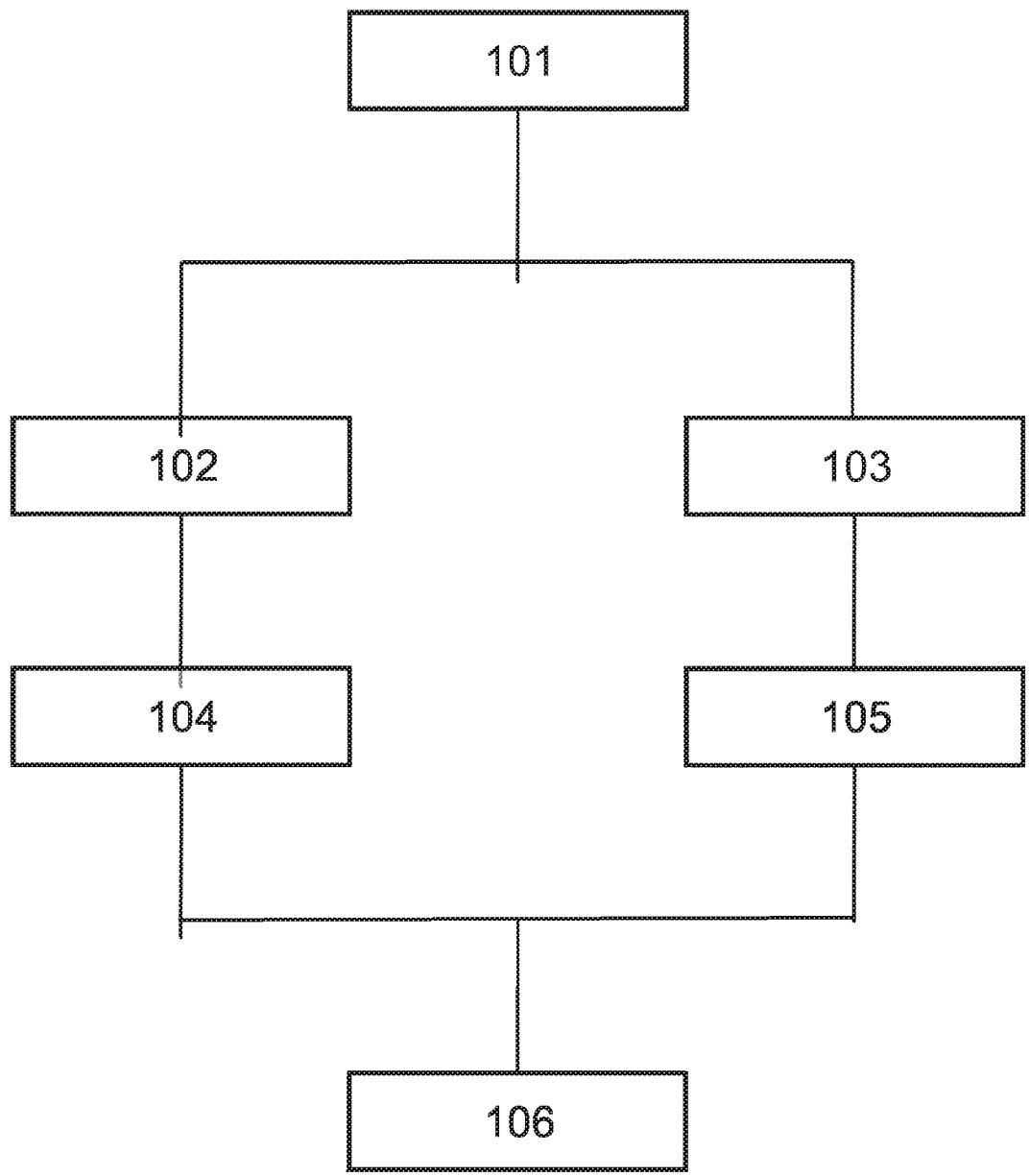
FIG. 1d flow diagram for a verification method

Figure 1d shows a flow diagram of a method for verifying the security document 1.

A security document 1 is preferably provided in a step 101. In a step 102 first transmission and/or reflection properties of a first region 3 are detected in a first spectral range. In a step 103 second transmission and/or reflection properties of the first region 3 are detected in a second spectral range. Steps 102 and 103 can be carried out in parallel or sequentially. In a step 104 a first data set specifying the first transmission and/or reflection properties is generated. In a step 105 a second data set specifying the second transmission and/or reflection properties is generated.

Steps 104 and 105 can be carried out in parallel or sequentially. In a step 106 the authenticity of the security document 1 or of the security element 1a is checked on the basis of the first data set and the second data set. Advantageously, further, in particular third and/or fourth transmission and/or reflection properties can also be detected in a third spectral range or in a fourth spectral range by the reading device 2.

The first, second, third and/or fourth spectral range is selected in particular from the group: IR range of the electromagnetic radiation, in particular in the wavelength range of from 850 nm to 950 nm, VIS range of the electromagnetic radiation, in particular in the wavelength range of from 400 nm to 700 nm, and UV range of the electromagnetic radiation, in particular in the wavelength range of from 1 nm to 395 nm.

To check the authenticity of the security document 1, the relative positional arrangement, in particular spacing, the relative size, the relative shaping, in particular the register accuracy of the orientation and shaping of image elements, the covering and/or the orientation of two or more security features 10 of the security element 1a relative to each other are preferably first determined by means of the comparison of at least the first data set and the second data set. In a further step the determined relative values of the two or more security features 10 are then compared with predefined reference values, wherein a denial of the authenticity is effected if the deviation lies outside a predefined tolerance range.

Furthermore, the following steps can also be carried out to check the authenticity of the security document 1:

determination of the positional arrangement and/or shaping of a first security feature 10a of the security element 1a by means of the first data set, determination of the positional arrangement and/or shaping of a second security feature 10b of the security element 1a by means of the second data set, comparison of the determined positional arrangements and/or shaping with each other to determine the relative positional arrangement, in particular spacing, the relative size, the relative shaping, in particular the register accuracy of the orientation and shaping of image elements, the covering and/or the orientation of two or more security features 10 of the security element 1a relative to each other.

Figure 2A:
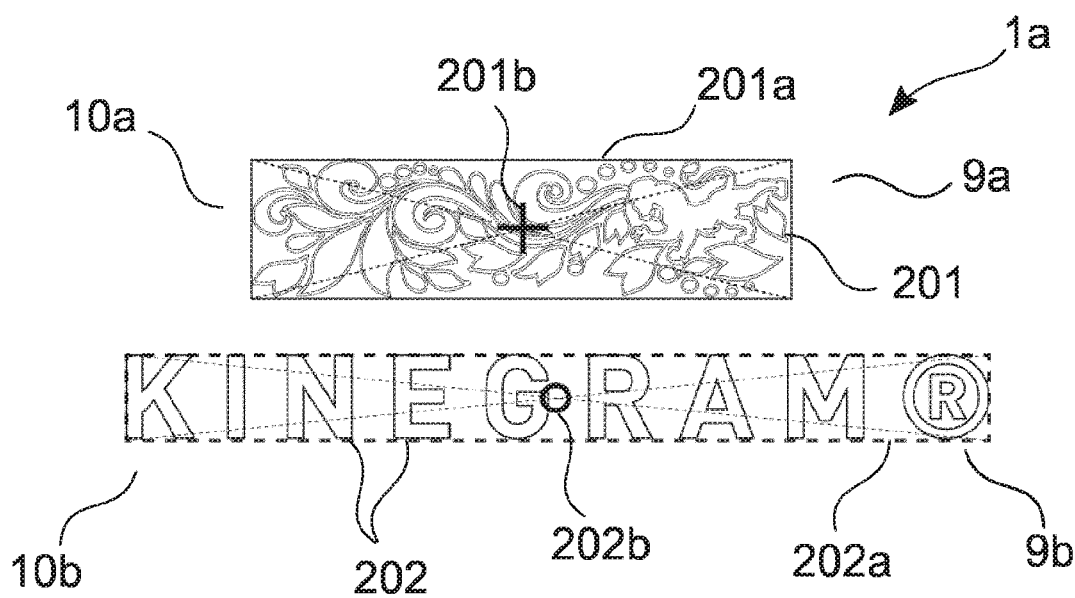
FIGS. 2a, 2b schematic representation of a UV print and a partial metallization with virtual bounding box FIGS. 3a, 3b, 3c, 3d schematic representation of a security feature in an embodiment FIGS. 4a, 4b, 4c a further schematic representation of a security feature in an embodiment FIGS. 5a. 5b, 5c, schematic representation of the superimposition of the security features shown in FIGS. 3 and 4

FIG. 2a shows a schematic representation of virtual bounding boxes 201a, 202a, preferably in the form of a rectangular frame, around one or more objects 9a, 9b on a security element 1a, in particular around a security feature 10a comprising a print 201 which fluoresces under UV irradiation and a security feature 10b comprising a partial metallization 202. The bounding boxes 201a, 202a preferably border the respective objects 9a, 9b as closely as possible. The first, second, third and/or fourth data set is preferably subjected to an image processing, whereby bounding boxes 201a, 202a are generated. The bounding boxes 201a, 202a serve to determine the center points 201b, 202b of the security features 201, 202. The center points of the bounding boxes 201a, 202a preferably correspond to the center points 201b, 202b of the objects 9a, 9b, in particular the UV print 201 and the partial metallization 202.

Figure 2B:
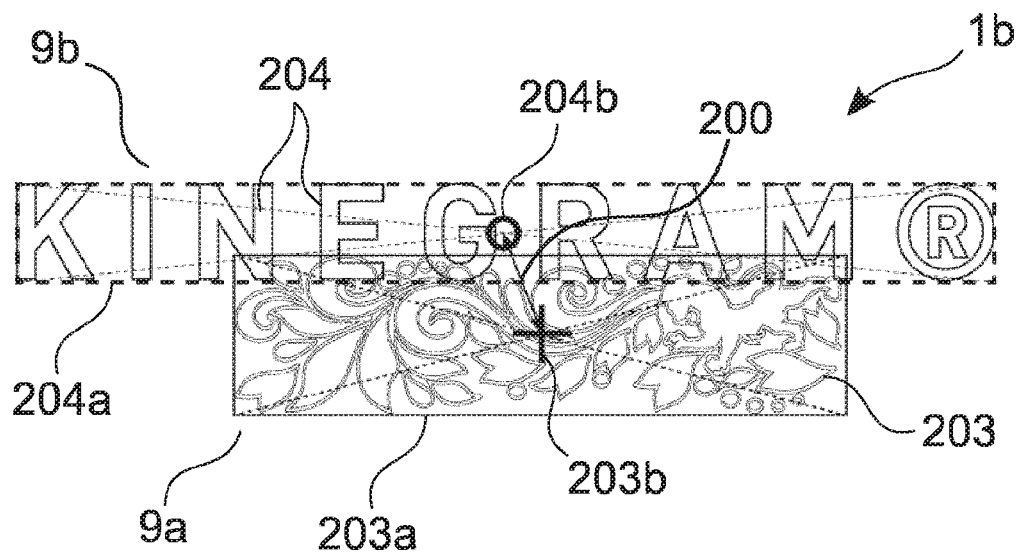

FIG. 2b shows a distance 200, represented by a double arrow 200, which shows the distance between the calculated center points 203b, 204b of the bounding boxes 203a, 204a. The check of the authenticity is then preferably effected by comparing the spacing 200 of the calculated center points 203b, 204b with a reference value.

The security element 1a of the security document 1 preferably has one or more security features 10.

FIG. 3a now shows a schematic representation of a first security feature 10a in a design as a UV-fluorescent print 205. The first security feature 10a preferably has one or more image elements 7a and a background region 7b surrounding the image elements 7a. The first security feature 10a shown in FIG. 3a is a color layer 8b, in particular a UV print 205, which is visible only in the UV range.

FIG. 3b shows a further schematic representation of a second security feature 10b. The second security feature 10b provides a partially shaped metal layer 8a as partial metallization 206, in particular with molded diffractive structures of a Kinegram®, which is easy to recognize in particular in the IR range. Under IR illumination the metal layer 8a primarily appears dark against the background region 7b.

The image of the second security feature 10b shown in FIG. 3b is preferably shown in soft focus with a bilateral filter. This is in particular a selective lowpass filter which leaves hard edges intact.

In particular, threshold images are calculated from the imagings of the first security feature 10a and of the second security feature 10b represented respectively in FIGS. 3a and 3b. To generate the threshold images, the following three calculations are preferably carried out, in particular one after the other.

In a first step an adaptive, binary thresholding is carried out. In the following example it is assumed that the grayscale image 256 comprises lightness values, wherein the lightness value 0 is allocated to the color black and the lightness value 255 is allocated to the color white.

For the adaptive, binary thresholding, a filter kernel which is large in comparison with the image resolution is preferably chosen, with the result that any edges present are correctly recognized. This first filter step results in particular in the error recognition of image features, contamination or other things, which are not in fact an actual motif edge. The result is an "edge image".

A constant binary thresholding is then carried out again and all lightness values which lie below a defined lightness value are set to the binary value 0, which is preferably allocated to the color black. The definition of the threshold is effected on the basis of prior knowledge with respect to the recognized document type. The result is a "black image". Example of the threshold with respect to the lightness: IR image: lightness value smaller than 60, UV image: lightness value smaller than 40.

These examples of values apply to an image with a lightness range of 256 values. Images with a lightness range of 512 values or of 1024 values are in particular also possible.

A constant binary thresholding is then carried out again on the scanned grayscale image and all lightness values which lie above a defined value to the binary value 1, which is preferably allocated to the color white. The definition of the threshold is effected on the basis of prior knowledge with respect to the recognized document type. The result is a "white image". Example of the threshold with respect to the lightness: IR image: lightness value greater than 140, UV image: lightness value greater than 60.

In the ideal case, the difference between light and dark, in particular lightness values which are perceived as light and lightness values which are perceived as dark is given in the case of an IR image by a value interval of more than 80 neighboring lightness values and in the case of a UV image by a value interval of more than 20 neighboring lightness values.

The three partial images are then combined such that the edge image is first multiplied by the black image on the pixel level, with the result that all black regions of the black image preferably thus also appear black in the edge image. The result is a black edge image.

The white image is then added to the black edge image, with the result that, preferably, all white pixels in the white image thus also appear white in the black edge image. The result is the threshold image.

FIG. 3c shows a schematic representation of the superimposition of the security features 10a and 10b of a security element 1a shown in FIGS. 3a and 3b under simultaneous irradiation in the IR range and in the UV range.

FIG. 3d shows a security element 1a under illumination in a second spectral range, in particular the UV range, which is composed of a superimposition of a first security feature 10a and a second security feature 10b. The UV fluorescent print 205, in particular consisting of UV-fluorescent ink, is visible only in the regions in which the UV print 205 is not covered by the metal layer 8a of the partial metallization 206, as the metal layer 8a is almost opaque, preferably completely opaque, both for the exciting radiation in the UV range and for the fluorescence of the print 205, wherein the optical densities of the metal layer 8a of the partial metallization 206 inherently have a value greater than 1.0, preferably a value greater than 1.3. The background region 7b advantageously barely fluoresces at all, or at least fluoresces much more weakly than or in a different color from the UV-fluorescent print 205.

A further advantageous variant of a security element 1 utilizes the diffraction properties of diffractive and/or stochastic structures, in particular scattering matte structures, in order to deflect, i.e. to diffract or to scatter, electromagnetic radiation, in particular from the IR and/or VIS range, into a reading device 2, in particular into one or more detectors of a reading device 2, further preferably into one or more sensors of a reading device 2. This has the result that regions of a security element 1a designed with these diffracting or scattering structures light up light, i.e. more intensely, preferably light up lighter, i.e. more intensely than a typical metal surface, in an IR image recorded in the IR range and/or in a VIS image recorded in the VIS range through the utilization of the diffraction properties, wherein possible production variations with respect to the molding of the diffracting structures are taken into consideration as manufacturing tolerances during the authenticity check of the security element 1.

Figure 4A:
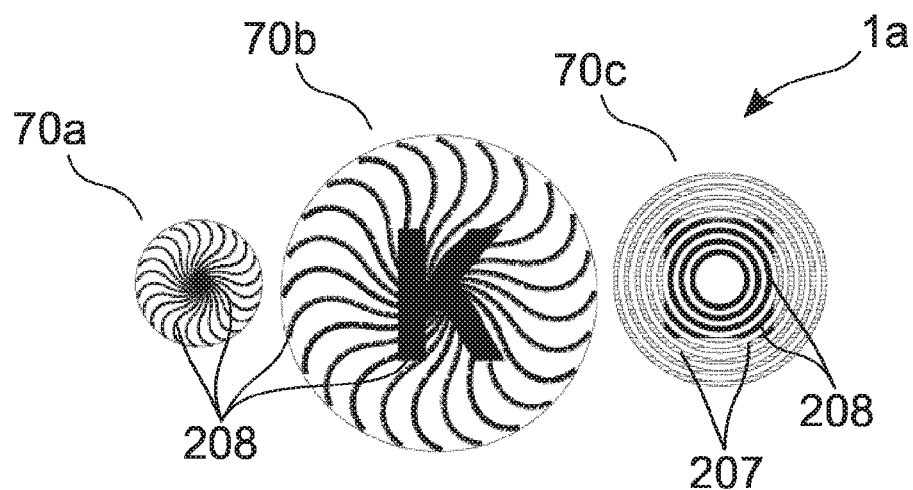

FIG. 4*a* shows three partial regions 70*a*, 70*b* and 70*c* of a security element 10 under illumination with one spectral range, in particular a VIS range, wherein partial metallization 208 shaped with a complex form, in particular in the form of geometric structures, further preferably in the form of alphanumeric characters made of curved lines or guilloches, are shown in the partial regions 70*a* and 70*b* and an image element 7*a* containing circular lines which are formed on the one hand as a color print 207 and on the other hand as a partial metallization 208 is shown in the partial region 70*c*. The color print 207 colored as desired in the partial region 70*c* merges into the partial metallization 208 tolerance-free.

Figure 4B:
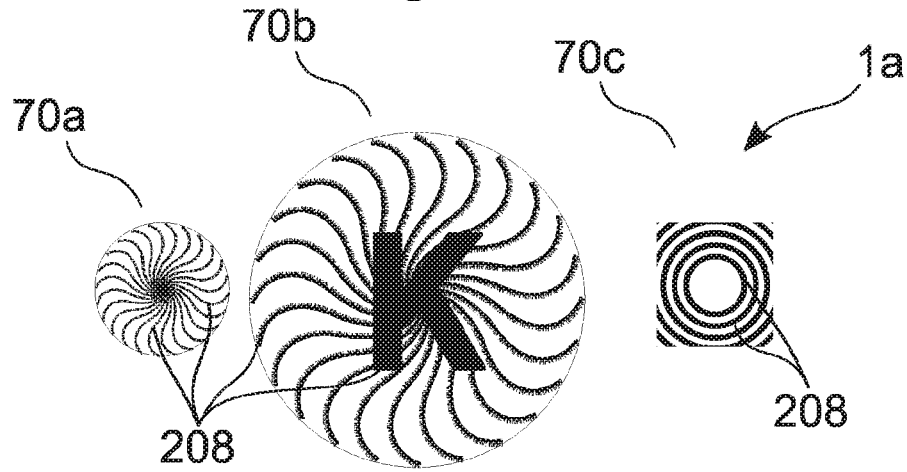

In an advantageous embodiment of the checking method, the authenticity check of the security element 10 represented in FIG. 4*a* is carried out in one or more spectral ranges, preferably a first spectral range and a second spectral range, further preferably in a VIS range and an IR range, wherein on the basis of the recording of the security element 10 in the corresponding spectral ranges a first data set allocated correspondingly to the first spectral range, preferably the VIS range, i.e. the VIS image, and a second data set allocated correspondingly to the second spectral range, preferably the IR range, i.e. that the IR image, is generated by the reading device 2. FIG. 4*b* shows the partial regions 70*a*, 70*b*, and 70*c* of the security element 10 under illumination in a second spectral range, preferably the IR range, with the result that only the partial metallizations 202 in the three partial regions of the security element 10 and not the color print 207 are detectable for the reading device 2, as the color print in this example does not absorb or absorbs only a little in the IR range.

In a first step the IR image can be compared, by a piece of software, preferably software containing algorithms, with a template, in particular a template data set and/or template image, further preferably a template, template image and/or template data set provided by a database, within the framework of a plausibility check or authenticity check, wherein various algorithms, preferably template matching, bounding box and A-KAZE, are carried out in parallel or sequentially. The partial region 70*a* can be designed as a diffractive and/or reflective structure, in particular a Kinegram®, which shows the same shape. i.e. appearance, or design in each of the first, second and third spectral ranges under observation, e.g. by a checking device or reading device 2. The position and/or the shape of the partial metallizations 208 of the partial regions 70*a*, 70*b* and/or 70*c* can vary within given tolerance ranges.

The partial regions 70*a* and 70*c* can differ inasmuch as the partial metallization 208 in the partial region 70*a* is preserved unchanged by an optional second partial metallization. The first and/or the second partial metallizations advantageously always lie in perfect register relative to the diffractive and/or reflective structures shaped in the partial metallizations 208 over the whole surface or over part of the surface, preferably one or more Kinegrams®.

After a first partial metallization 208 of the security element 10 the partial region 70*c* can be overprinted with an etch resist, in particular a colored etch resist, further preferably a blue etch resist, wherein the tolerance ranges of the position, shape and/or register accuracy of the etch resist relative to the partial metallization 208 can be taken into consideration during an authenticity check. An etch resist, in particular a colored etch resist, further preferably a blue etch resist, is characterized on the one hand by the effect of the color and on the other hand by the property that the etch resist can act as an etch mask for a further partial metallization.

In the case of a colored etch resist, in particular a blue etch resist, the VIS image is checked during an authenticity check as to whether the colored, in particular blue, lines of the etch resist merge registration-accurately and/or position-accurately and/or register-accurately into the metallic lines of a first partial metallization 208 and/or second partial metallization, wherein the metallic lines of the first and/or second partial metallizations are visible in the IR image, or detectable by a reading device 2. The colored, in particular blue, lines of the etch resist are preferably invisible in the IR image, i.e. not detectable by a reading device 2, as the in particular blue dye used acts in an only weakly absorbing manner, preferably without absorbing, in an IR range, in particular in a near-IR range, preferably in a near-IR range in a wavelength interval of from 800 nm to 1000 nm, which is provided for the IR check, in particular the authenticity check.

Figure 4C:
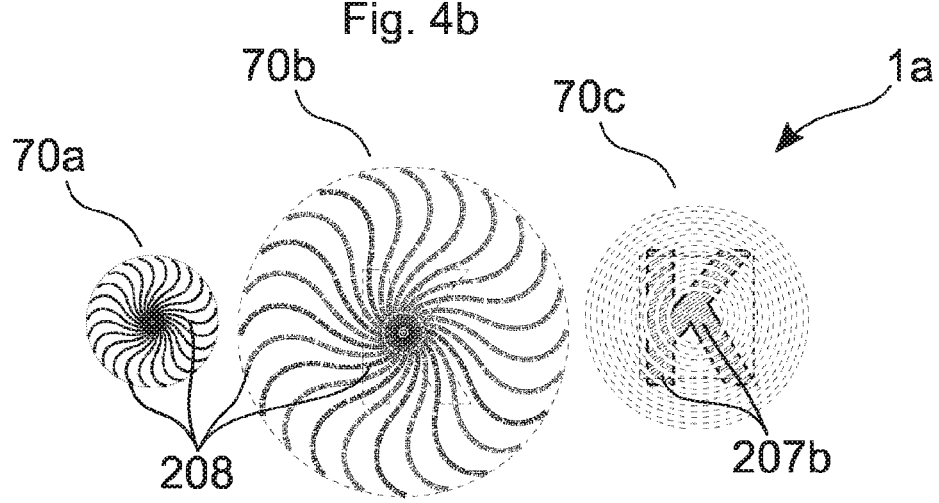

In a further step an authenticity check is carried out in a third spectral range, in particular the UV range, wherein the color and/or register accuracy and/or registration accuracy and/or shape of the UV-fluorescent print 207*b* is checked relative to the partial metallizations located in front of the UV-fluorescent print 207*b* from the detection direction of a reading device 2 and/or colored, in particular blue, etch resist or etch resist print. FIG. 4*c* shows the partial regions 70*a*, 70*b*, and 70*c* of the security element 10 under illumination with radiation from a third spectral range, in particular radiation from the UV range, with the result that only the UV-fluorescent print 207*b* not covered by the partial metallizations 208 in the image element 7*a* are detectable by a corresponding reading device 2 and can be converted into a third data set, in particular a UV image. The UV-fluorescent print 207*b* underneath the color print is recognizable or not, or is attenuated by the color print 207, depending on the properties of the color print 207, in particular of the blue etch resist. Within the framework of a plausibility check, it can preferably further be checked whether the color of the light emitted by the UV-fluorescent print 207*b* has a particular color, in particular a yellow color, wherein the UV-fluorescent print 207*b* can be excited by radiation, in particular electromagnetic radiation, in particular UV radiation.

Furthermore, the typical values of the tolerances of features of different objects selected from position, color, ink coverage, reflection, orientation, size, shape, electromagnetic properties, reflection, personalization and area coverage of one or more of the designs of the partial region 70*a* relative to one or more of the designs of the partial region 70*c* of the security element 10, in each case selected from the UV-fluorescent print 207*b*, the colored, in particular blue, etch resist and/or the partial metallizations 208, are in each case ±0.8 mm, in particular ±0.5 mm, preferably less than 0.2 mm and more than −0.2 mm. In particular, the tolerances of the colored, preferably blue, etch resist and of the UV-fluorescent print 207*b* in the partial region 70*c* relative to the partial metallizations 208 of the partial region 70*a* lie in the range ±0.8 mm, in particular ±0.5 mm, preferably less than 0.2 mm and more than −0.2 mm. These tolerances result from typical variations in printing processes brought into register relative to each other and can also be much smaller or larger depending on the machinery and control.

The comparison of the properties of a security feature 10, i.e. In particular the geometric and/or optical properties, with the corresponding properties of a template, or reference image, preferably serves as a first plausibility test, in particular for precisely locating, i.e. determining the position of, the security features 10.

The check for authenticity preferably relates to the tolerance-free transition, i.e. the registration accuracy or register accuracy, between a colored print 207, in particular an etch resist and/or UV-fluorescent print 207b, in particular a UV-fluorescent etch resist and/or an IR-active print, and the regions with partial metallizations 208.

In a further advantageous method, the security feature 10 to be checked is located in the partial region 70c by a reading device 2 and segmented into at least two partial regions, which contain the UV-fluorescent print 207b and/or the colored, in particular blue, etch resist and the partial metallizations 208, by observation in at least two different spectral ranges. An algorithm, preferably the accelerated KAZE (A-KAZE) feature detector/descriptor, is implemented in order to recognize, or to determine, key points, such as for example end points of the printed lines 207, 207b, in particular circular lines, and the metallic lines of the partial metallizations 208. The algorithm or a further algorithm then carries out a comparison of the coordinates of the key points between the data sets, in particular the VIS image and the IR image, in order to check the register accuracy in the transition regions of the printed structures 207, 207b and metallic structures 208, or lines, wherein the shapes and/or the inclines of the printed structures 207, 207b and metallic structures 208, in particular in the transition regions, can also be checked. This procedure is advantageous if intrinsic or inherent properties of a security element are used, as the security feature can be checked for its existence with a high probability or confidence. The checking method is independent of possible application tolerances, i.e. tolerances during application of security features to a substrate, and distortions, i.e. warping, of the security feature, as these do not influence the described local properties. The checking method is likewise not significantly impaired by damage, such as for example due to smaller missing areas and/or kinks, with respect to the security feature 10 to be checked.

Possible damage to the security element to be checked in cases where the security element 1a, 1b is additionally provided with a partial overprint, in particular by means of a letterpress printing, an offset printing or an intaglio printing, are to be taken into consideration in every case during the checking method, as the properties to be checked of a partial metallization, in particular a diffractive and/or reflective structure, further preferably a Kinegram®, can be markedly impaired thereby. The same applies to mechanical modifications of a security element, such as for example a security stamp or a blind embossing. However, corresponding algorithms, in particular shape-recognition algorithms, further preferably feature matching, are capable of taking possible distortions in one or more images to be compared into account and correspondingly compensating for them. Further, a compensation factor can advantageously be transferred to the algorithms, in order to take into account image errors to be expected, which lie within the tolerance ranges, for example varying widths of security elements due to alterations of the security document caused by the application process or age, during the evaluation of the data sets, or images, by the algorithms. Thus, for example, a compensation of less than 10%, in particular less than 5%, is to be expected in order to compensate for strains during manufacture or during use.

In principle, it is advantageous if for each of the one or more security features 10 of a security element 1a, 1b to be checked an acceptance level is determined in advance, which divides the results of the authenticity check of the security document 1 into accepted and not accepted authenticity results.

Figure 5A:
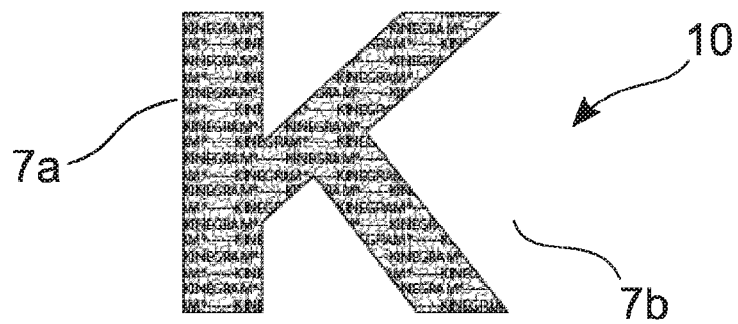
Figure 5B:
Figure 5C:
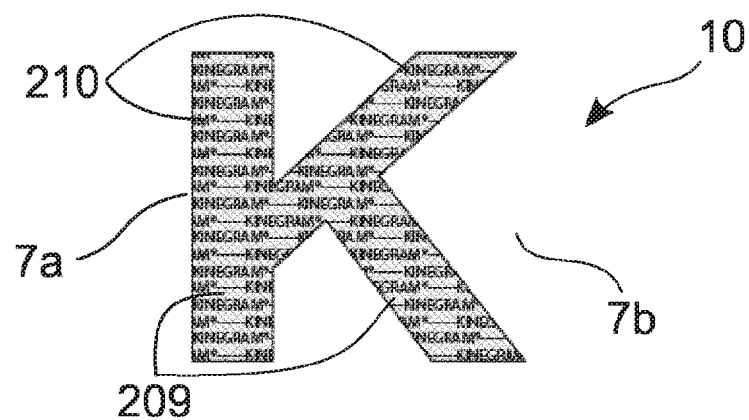

In a further advantageous method for checking the authenticity of a security document 1 comprising a security element 1a, as shown in FIGS. 5a to 5c, wherein the image element 7a of the security element 1a is designed with a colored print 209, further preferably an additional UV-fluorescent print, which is arranged in perfect register relative to a partial metallization 210 when observed from the observer direction, in particular the detection direction of a reading device 2. In the partial metallization, a diffractive and/or refractive and/or scattering structure, which diffracts light incident in a first spectral range, in particular a VIS range, at least partially into a camera or a sensor 25 of a reading device 2, as shown by way of example in FIG. 5a, and does not diffract IR radiation in a second spectral range, in particular an IR range, or diffracts it only to a small extent, into a camera of a reading device 2, as shown by way of example in FIG. 5b, can be molded over the whole surface or over part of the surface.

A recording, or a data set, recorded by a sensor 25, in particular a camera, preferably a detector, of a reading device 2 thus shows a colored partial region 7a containing the colored print 209 of a security element 1, which corresponds over the whole surface or over part of the surface to the partial region 7a containing the partial metallization 210. In the second spectral range, in particular an IR range, however, the partial region 7a appears dark in front of a lighter background region 7b of a substrate of a multilayered security element 1a. Further preferably, the ink, preferably a red ink, of the colored print 209 contains at least one pigment which is fluorescent under UV irradiation, preferably a pigment which fluoresces yellow, with the result that the partial region 7a containing the colored print 209 gives out or emits light that is colored, in particular yellow, under fluorescence in a third spectral range, preferably a UV range, as shown by way of example in FIG. 5c.

An authenticity check of the security element 1a now consists of comparing the first data set allocated to the VIS range, the second data set allocated to the IR range, the third data set allocated to the UV range and further data sets allocated to one or more spectral ranges, data sets allocated however to at least three spectral ranges with respect to the position, the shape and the expected one or more colors, the registration accuracy, the register accuracy and/or the precision of the intensity modulation with each other by means of a piece of software, in particular software containing algorithms, wherein during a plausibility check a comparison between the first, second and third data sets with a template, in particular a template data set, further preferably a template data set contained in a database, takes place and during an authenticity check the intrinsic or inherent properties of the security element 1a are checked. During the authenticity check, the exact comparison of the data sets with a reference image, i.e. a template, is preferably not to the fore, but the detection of the intrinsic properties is, with the result that for example deviations, for example because of production tolerances, do not play a decisive role for the authenticity check.

Thus, for example, a colored image element 7a of a security document 1a can be implemented, we in FIG. 5a, in the form of an alphanumeric character, in particular the letter "K", wherein the image element 7a is provided with a colored print 209, further preferably a UV-fluorescent print, which has a partial metallization 210, in particular a metallic reflective layer, placed behind it register-accurate when observed from the observer direction, or from the direction of a sensor of a reading device 2. Further, in the image element 7a diffractive and/or macroscopic and/or scattering structures 210, which diffract and/or scatter light incident on the security element 1a, can be molded over part of the surface or over the whole surface, wherein these diffractive and/or macroscopic structures 210 in a preferred embodiment can be designed as structures selected from one or more one- or two-dimensional grating structures with sinusoidal, rectangular and/or asymmetric reliefs and/or matte structures.

Advantageously, the security element 1a contains one or more replication layers containing one or more surface reliefs shaped over the whole surface or over part of the surface as optically variable elements, in particular at least a selection from a hologram, Kinegram® and/or Trustseal®, a preferably sinusoidal diffraction grating, an asymmetric relief structure, a blazed grating, a preferably isotropic or anisotropic matte structure or a light-diffracting and/or light-refracting and/or light-focusing microstructure or nanostructure, a binary or continuous Fresnel lens, a microprism structure, a microlens structure or a combination structure.

In a further advantageous embodiment, a matte structure is at least partially shaped on a layer of a security element 1a arranged, observed from the direction of a detector of a reading device 2, behind a color print 209, in particular a partially transparent print, further preferably a UV-fluorescent print, wherein this matte structure scatters incident light in such a way that most of the scattered light is incident in a sensor of a reading device 2 during a check of the security element 1a. The ink, in particular red ink, of the color print 209 here acts as a filter, in particular a spectral filter, for the incident light, with the result that the scattered light appears in a red coloring to an observer and/or a reading device 2 and appears in the form of a correspondingly colored alphanumeric character, in particular in the form of the letter "K", due to the shaping of the image element 7a. Furthermore, different diffraction-optical structures can be shaped in the image element 7a in line form, planar form or in the form of alphanumeric characters, lines and/or texts relative to the print 209 designed in the partial region 7a with a tolerance of ±0.5 mm, in particular of ±0.2 mm, preferably of less than 0.2 mm and more than −0.2 mm, in the horizontal and in the vertical direction, as shown by way of example in FIG. 5a, which can preferably have a line number of more than 2000 lines per mm, with the result that light can no longer be diffracted into a camera of a reading device 2 and the corresponding regions, or partial regions, appear dark. In Figures Sa, 5b and 5c the substrate with a possible further print 209 is not shown.

FIG. 5b shows the partial region 7a under illumination by radiation in the IR range, wherein the partial metallization 210, i.e. the metallic region, appears dark against the partial regions of a lighter substrate in a background region 7b. Depending on the design of the matte structure and arrangement of the illumination in the checking device, the matte region can likewise light up. If a fluorescent dye is added to the ink of the print 209, the image element 7a can light up under irradiation in a UV range light in a predetermined color, in particular a yellow color.

In an advantageous checking method the at least three recordings, i.e. images or data sets from preferably the VIS range, the IR range and the UV range, are correlated with each other by means of a piece of software, in particular software containing algorithms, wherein an authenticity check is carried out for each individual image, i.e. for each individual data set. A check which uses the relationships inherent in the feature between these different data sets for the authenticity check is particularly advantageous.

In a further advantageous method the transmission properties and/or the reflection properties of a first region 3, preferably of a window element, further preferably of a window feature, of a security document 1 are detected in one or more spectral ranges by the reading device 2 both from the front side 6a and from the rear side 6b, and for this one or more data sets allocated to the corresponding spectral ranges are generated, which in each case contain a first item of information with respect to the 1s front side 6a of one or more security elements 10 detectable on the front side 6a and a second item of information with respect to the rear side 6b of one or more security elements 10 detectable on the rear side 6b, wherein an authenticity check of the security document 1 is effected with the aid of the analysis of the data sets by a piece of software, in particular software containing algorithms, and/or a comparison of the analysis results, in particular threshold images, with a template, in particular with a threshold image template, further preferably with a threshold image template located in a database. Further, the inks and/or diffraction-optical structures designed over the whole surface or over part of the surface on the rear side 6b of the security document to be checked can advantageously differ within the meaning of the authenticity check from the inks and/or structures designed over the whole surface or over part of the surface on the front side 6a of the security document 1 or be present only on one side, i.e. on the front side 6a or the rear side 6b, and be used as a further checking feature, wherein the arrangement of the inks and/or structures of the front side 6a can behave register-accurate, in particular within a register tolerance of t0.5 mm, in particular of ±0.2 mm, preferably of less than 0.2 mm and more than −0.2 mm, relative to the arrangement of the inks and/or structures of the rear side 6b.

Furthermore, one or more properties selected from position, color, ink coverage, reflection, orientation, size, shape, electromagnetic properties, reflection, personalization, and area coverage, of the colored and/or structured regions can be recognized by software via the provision of a data set and compared with a reference data set, i.e. a template, for the authenticity check. Features which have a precise register accuracy are particularly advantageous. Thus, for example, a partially metallized security feature can be metallic from the front side, while the same metallic regions can have color placed behind them exactly in register, i.e. tolerance-free, when observed from the rear side.

In a further advantageous method one or more superimposed first regions, which partially or completely comprise one or more security features 10 of one or more security elements 1a of a security document 1, are read by a reading device 2 in one or more spectral ranges, in particular selected from a VIS range, an IR range and a UV range, and one or more data sets 5 are allocated to the spectral ranges correspondingly, wherein a piece of software, in particular software comprising one or more algorithms, in particular template matching, bounding box or A-KAZE, allocates the security document 1 to a type, or model, preferably a type or model contained in a database, via the evaluation of the data sets, wherein the database provides one or more properties selected from type, design, position, registration accuracy, register position, color, ink coverage, reflection, orientation, size, shape, electromagnetic properties, reflection, personalization, and area coverage of the color prints 209 and/or partial metallizations 210 of the security features 10. The partial metallizations can in particular be designed as part of a Kinegram®. Further, the allocation criteria during the authenticity check of the security document 1 can advantageously be made dependent on the version, the model and/or the manufacturer of the reading device 2, or checking device, in order to take into account version-based variances of the illuminations and/or of the sensor conditions and/or sensor settings, or camera conditions and/or sensor conditions, in the analysis and comparison of the data sets with reference data sets, in particular templates, further preferably templates stored in a database. Furthermore, there is the further advantage that manufacturing tolerances, which occur during the production of the partial metallizations 210 and/or distortions during the application of the partial metallizations 210 and/or during the embedding of the partial metallizations 210 in a security document 1, of a plastic document, in particular a polycarbonate document, are taken into account within the framework of the authenticity check of the security document 1.

In a further advantageous embodiment a first allocation of the security document 1 is effected on the basis of the information contained in the security document 1 itself, such as for example in a machine-readable zone, a barcode or an electronic component, such as for example a chip. With the aid of this information the further analysis and the comparison with the database are effected.

In a further advantageous checking method for the authenticity check a security document 1 is checked, its regions having relief structures, with an HRI layer, which is arranged behind or in front of the structured regions from an observer's view, wherein the HRI layer can additionally be provided with a color layer. Further, a color design, contained in the color layer, can be printed with a register accuracy of ±0.5 mm, in particular of ±0.2 mm, preferably of less than 0.2 mm and more than −0.2 mm, relative to a region with a matte structure, which is molded into the structured regions, wherein the HRI layer is not present in the interspaces, i.e. in the regions in which neither the color design nor the matte structure is present. If the reflective layer in particular is not formed, the matte structure, which is shaped in particular as a relief structure, for example in a replication layer, can still be present, but not perceptibly or optically detectable because of the lack of a reflective layer.

Furthermore, the ink of the color design can be observable only in a VIS range and/or be detectable only in an IR range, and the ink of the color design can be designed partially or completely with UV-fluorescent pigments, with the result that the position of the partial regions which fluoresce in a UV range is arranged in perfect register relative to the partial regions visible in a VIS range and relative to the matte structures detectable in an IR range and/or VIS range.

FIG. 6a shows a ray-like design element or security element 1a under illumination in a VIS range, which has a matte structure in a central region 70e, wherein the matte structure scatters incident light into a camera of a reading device 2 both under illumination in a VIS range and under illumination in an IR range. The scattering effects of the matte structure are observable only in the regions 70e of the design element designed with the HRI layer, with the result that compared with an observation in a VIS range a clearly recognizable change in contrast or a change in contrast which can be evaluated with the camera is detectable at the transitions to the matte structure.

FIG. 6b shows the ray-like design element under illumination in an IR range, wherein the ink of the color design is chosen such that it has no absorbing effect under illumination in an IR range, with the result that in FIG. 6b only the partial regions 70e of the design element designed with a matte structure and an HRI layer are shown, wherein the partial regions of the design element must coincide register-accurately with the central regions 70e in FIG. 6a.

Advantageously, UV-fluorescent pigments can be admixed with the color varnish or the ink of the design element, with the result that under illumination from a UV range the entire region 70f of the design element lights up, as shown in FIG. 6c.

Thus, different partial regions of the design element are observable in under three different illuminations, which must be arranged registration-accurate and/or register-accurate relative to each other, wherein these properties can be checked by means of software within the framework of an authenticity check of the security document 1. Possible printing tolerances of the color print of the design element relative to the central region of the design element containing the matte structure are not relevant for the check of the above-described intrinsic or inherent, or self-referencing, properties.

FIG. 6d shows a security document 1, in particular the data page of a passport, comprising a security element 1a, in particular a ray-like design element 600, which is molded in a partial region of the front side 6a of the security document 1, wherein the at least the surrounding region 7b with respect to the security element 1a is not provided with an HRI layer.

Figure 7A:
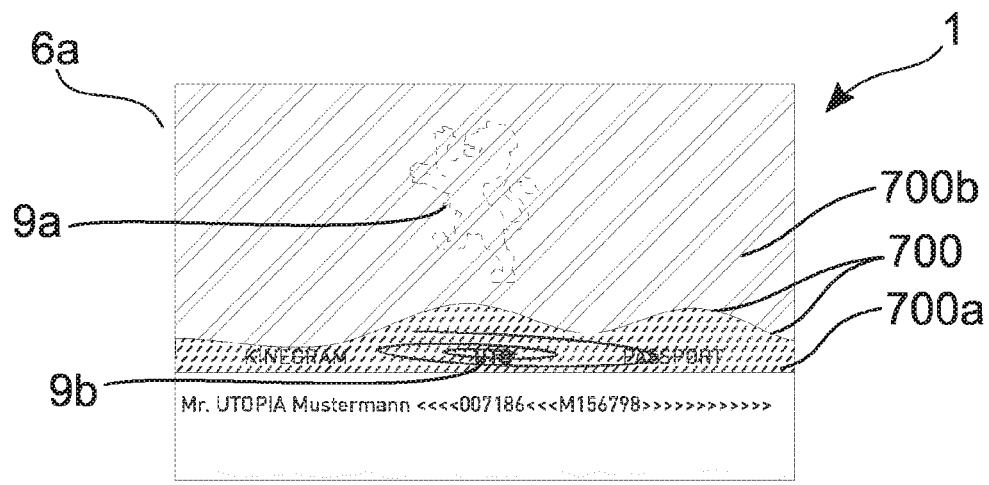

FIG. 7a shows a further advantageous example. A transparent layer containing a KINEGRAM® TKO (TKO=Transparent KINEGRAM Overlay) is used for the protection, in particular for the protection against forgery, of a front side 6a of a security document 1, wherein the front side 6a contains data readable by a reading device 2, which can be used for an authenticity check and/or plausibility check of the security document 1. An HRI layer is used as a reflective layer. In a structured background region 700a of the front side 6a, a grating structure with a line number of preferably more than 2000 lines per mm is shaped over the whole surface or over part of the surface, whereby in the case of illumination in a first spectral range, in particular a VIS range, and a second spectral range, in particular an IR range, no light from diffraction orders is reflected into a sensor, i.e. camera, of a reading device 2. The grating structure further has an HRI layer placed under it observed from the front side 6a, with the result that the grating structure together with the HRI layer has a filter effect, as the grating structure influences how much light can transmit through the HRI layer in a wavelength-dependent manner, which can then be reflected back or scattered back by the front side 6a of the security document 1.

Further preferably, in the structured background region 700a there is a partial metallization shaped over part of the surface, preferably in the form of one or more alphanumeric characters, here as object Gb in the form of three letters "UTO", which lies positionally accurate relative to one or more edges of the structured background region 700a. The TKO can vary in terms of position by up to ±2 mm, in particular by up to ±0.8 mm, preferably by up to ±0.2 mm, with respect to the substrate because of application variations.

Particularly preferably, the security document 1 can be checked by the reading device 2 in some regions, wherein in particular a predetermined preselection and/or a preselection determined by the reading device 2 of the regions to be checked takes place. Further preferably, the regions to be checked can also be selected from a data set, in particular by an algorithm.

Further, a contrast difference between the structured background region 700a and the background region of the TKO 700b containing one or more further structures or mirror regions is observable under illumination, in particular under illumination from an IR range, of the security document 1, wherein the formation of the contrast difference over the surface of the security document 1 is compared with a template, in particular a template data set, further preferably a template data set stored in a database, in order to determine the authenticity of the security document 1.

Figure 7B:
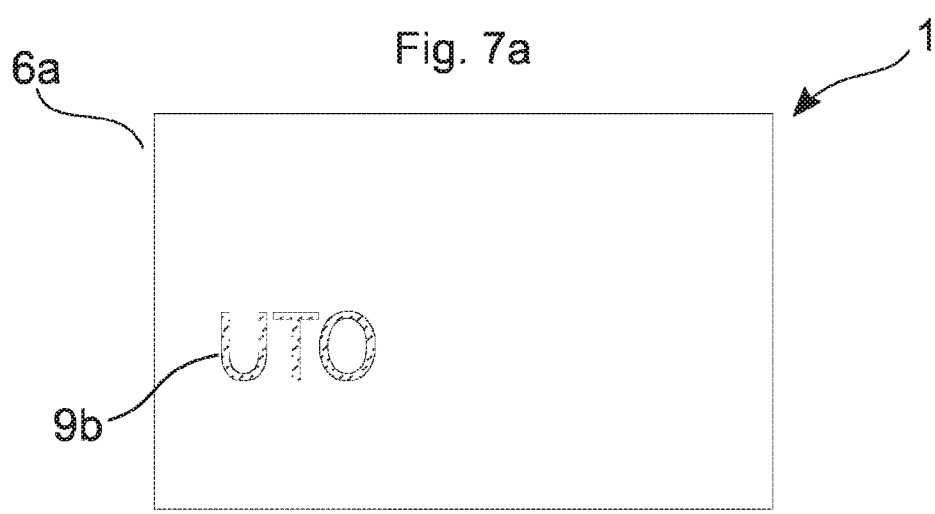
Figure 7C:
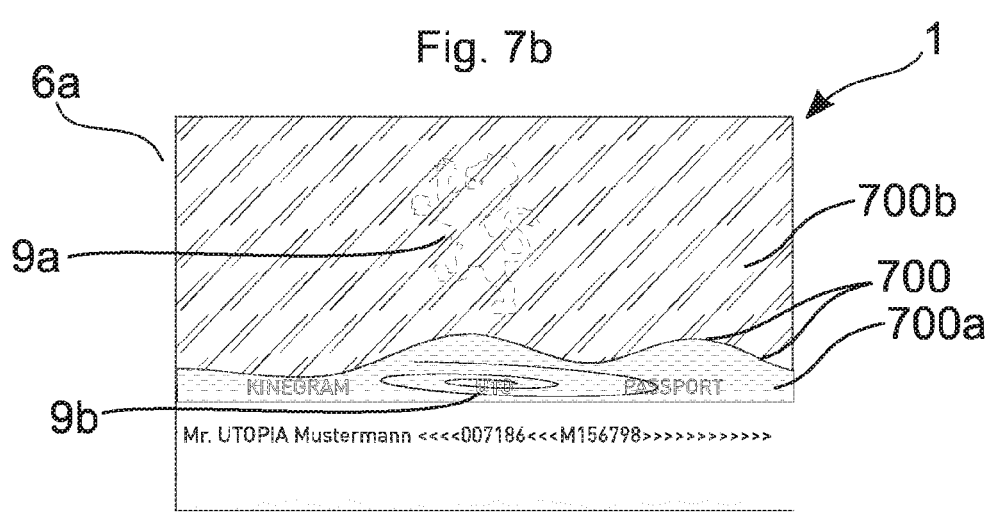

In a further advantageous method, the position of the partial metallizations in the region of the object 9b, in particular bearing the shape of a sequence of three letters, can additionally be determined through the illumination in an IR range, as shown in FIG. 7c, and used as a further checking step in an authenticity check, wherein the partial metallizations as intrinsic or inherent properties of the security document 1 lies in perfect register relative to the edge of one or more further security elements 1a, design elements and/or of the security document 1.

Advantageously, in a further spectral range, preferably a VIS range, a color contrast and/or lightness contrast can between the diffractive region of the grating structure in the structured background region 700a of the TKO and the remaining background region 700b of the TKO, which are separated by a contrast edge 700 shown in FIG. 7a, wherein the contrast difference results from the filter effects of the respective diffractive structures, as these particular wavelength ranges, or frequency ranges, of the one or more spectral ranges of the incident light scatter back and/or reflect and/or transmit differently.

Further preferably, the security document can comprise a print, in particular UV-fluorescent print, in the structured background region 700a and/or the remaining background region 700b, which is printed on a film layer and/or a substrate contained in a security document 1.

FIG. 7a shows the security document 1 under illumination from a VIS range, FIG. 7b shows the security document 1 under illumination from a UV range and FIG. 7c shows the security document 1 under Illumination from an IR range.

The UV print detected in a UV range in the region of the object 9b, which in FIG. 7b bears the shape of a sequence of three letters "UTO", is register-accurate, with a tolerance of 10.5 mm, in particular of ±0.2 mm, preferably of less than 0.2 mm and more than −0.2 mm, relative to the partial metallization detected in an IR range in the region of the object 9b, which in FIG. 7c likewise bears the shape of a sequence of the three letters "UTO", and the outer contours of a RICS structured surface. A RICS structure (Rotation Induced Color Shift) comprises in particular a zero-order diffractive structure with an HRI layer placed behind it, in particular a zero-order diffraction grating, with a period below the wavelength of visible light, in particular half the wavelength of visible light. In particular, the RICS structure reflects particular wavelength ranges in mirror reflection which are dependent on the orientation of the RICS structure. Under Illumination in the IR range, in the case of a RICS structure, preferably dependent on the observation angle, a contrast relative to a structure without RICGS effect can in particular also be recognized. Further, the at least two image elements detectable under illumination from an IR range can be compared with the at least two objects 9a, 9b detectable under illumination from a VIS range with the position and/or formation of the structured background region 700a and/or of the remaining background region 700b and applied as a further checking step within the framework of an authenticity check of the security document 1.

Figures 8A, 8B:
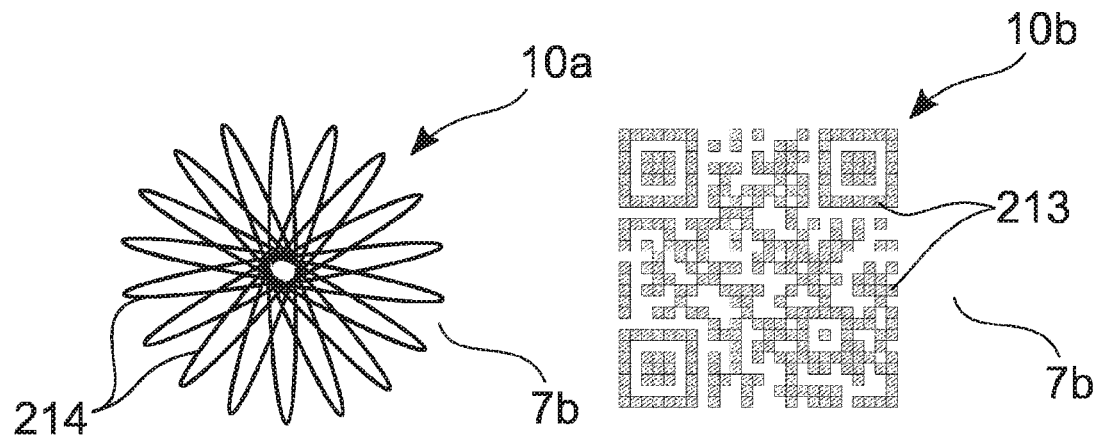

In a further advantageous embodiment of the security element 1a and of the checking method the security element 1a is designed and checked using the following steps in the form of a QR code:

In a first step a diffractive and/or reflective relief structure, preferably a Kinegram®, and/or a zero-order diffraction structure and/or a Kinegram® zero.zero is realized as a first security feature 10 with a partial metal layer 8a. In FIG. 8a the partial metallization 214, or the Kinegram®, is shown by way of example as a closed rosette pattern, wherein the material of the metal layer 8a is provided in particular in the regions of the image elements 7a of the first security feature 10a and is not provided in a background region 7b surrounding the image elements 7a.

In a second step a print 213 consisting of a UV-fluorescent ink, which is not visible in the visible range or VIS range, is overprinted onto the first security element shown in FIG. 8a, wherein the print 213 is molded as a second security feature 10b in the form of a QR code in the regions of the image elements 7a as a complete first item of information and the shaded areas of the image elements 7a preferably represent the UV-fluorescent print 213, wherein the material of the color layer 8b is in particular provided in the regions of the image elements 7a of the first security feature 10a and is not provided in a background region 7b surrounding the image elements 7a.

Figures 8C, 8D:
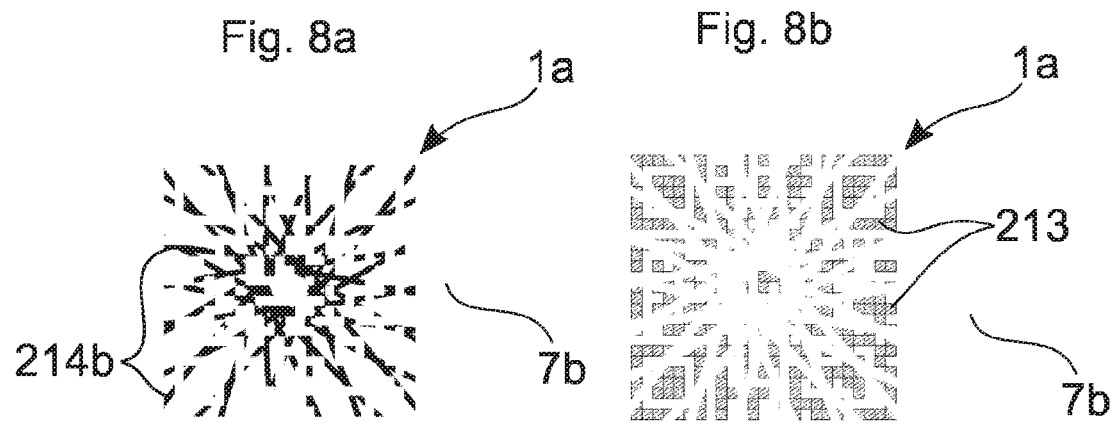

In a third step the print 213 acts in particular as an etch resist mask for a further partial metallization 214b on the basis of the partial metallization 214 already carried out in the first step, with the result that regions of the partial metallization 214 which have not been overprinted by the print 213 are demetallized. FIG. 8c shows the IR image of the partial metallization 214b remaining after the demetalization through an illumination with IR radiation, in particular from the first spectral range, further preferably from the IR range, wherein a first data set contains at least the IR image as a partial image of the QR code, which no longer comprises the complete first item of information but comprises a first part of two parts of the complete first item of information of the second security feature 10b.

FIG. 8d shows the UV image of the regions of the UV-fluorescent print 213 through an Irradiation by UV radiation, in particular from a second spectral range, further preferably from the UV range, which is produced the regions of the print 213 not covered by the partial metallization 214b, wherein a second data set contains at least the UV image as a partial image of the QR code, which no longer comprises the complete second item of information but comprises a second part of two parts of the complete first item of information of the second security feature 10b.

Figure 8E:
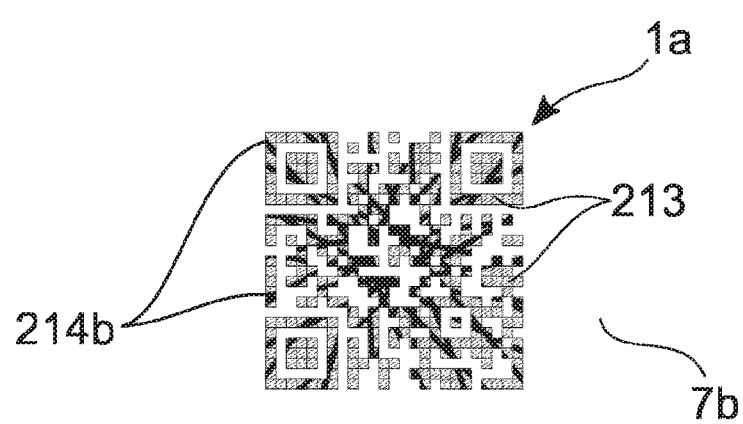

The total image produced by a piece of software containing algorithms in the form of the complete QR code is shown in FIG. 8e and is a data set consisting of the combination of the first part and the second part of two parts of the complete first item of information of the first data set and of the second data set.

In a further advantageous embodiment a first security feature 10a and a second security feature 10b are arranged deliberately not register-accurate, are preferably even arranged in spaced-apart partial regions of the security document 1, and the corresponding data sets are joined together to form a total image by a piece of software, in particular software containing algorithms.

A recording of the QR code only in a first spectral range, in particular the IR range, only in a second spectral range, in particular the UV range, only in a third spectral range, in particular the VIS range, or only in a fourth spectral range by a reading device 2, in particular a document checking device, contains only a part of the complete first item of information, which is contained in the second security feature 10b as the complete QR code, with the result that it is not possible to obtain the complete first item of information from the QR code. The combination of the first data set, generated in a first spectral range, in particular the IR range, and the second data set, generated in a second spectral range, in particular the UV range, however, makes it possible, by means of a piece of software containing algorithms, to reconstruct the complete first item of information, which is contained in the second security feature 10b as the QR code.

During the image processing the UV image is preferably filtered, wherein only the appropriate yellow pixels, or image points, in particular image point data, are taken into account and are represented black in a UV binary image generated by a piece of software containing algorithms, preferably image-recognition algorithms and pattern-recognition algorithms, from the UV image. Further preferably, during the image processing the IR image recorded under IR illumination is filtered, wherein the metallic regions of the partial metallization 214b appearing dark are taken into account and are represented black in an IR binary image generated by the software from the IR image. Through the register-accurate superimposition of the UV binary image and the IR binary image, the complete OR code is disclosed as a further binary image, with the result that the complete first item of information is readable from the QR code.

As a further checking step with respect to the authenticity of the security element 1a, the register accuracy of the UV binary image and of the IR binary image can be checked, as in the region of the QR code, which is composed of the UV binary image and the IR binary image, there is an almost tolerance-free transition, preferably a tolerance-free transition.

Figure 9:
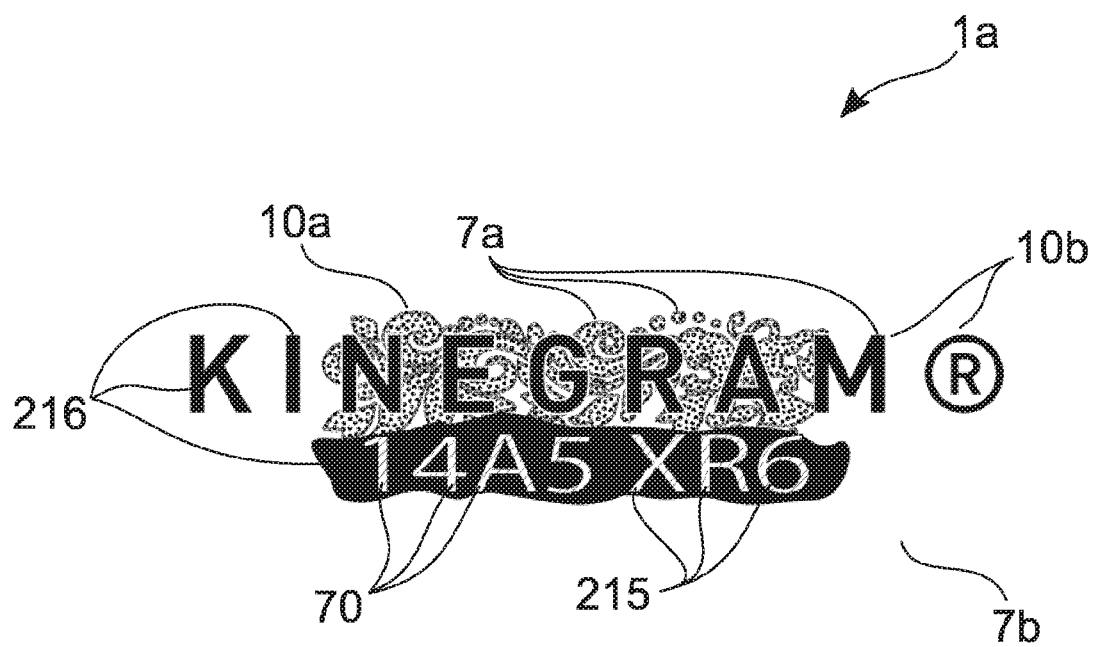

An advantageous embodiment of the security element 1a is shown in FIG. 9 and consists of introducing an individual marking, preferably consisting of alphanumeric characters, as further personalization and/or individual characterization in one or more planar partial regions 70 of the partial metallization 216 shaped as desired, preferably by means of a laser, in particular a laser diode. In a particularly advantageous embodiment a color print 215 acted as colored etch resist varnish in order to produce the partially metallized regions 216. If the metal layer is now removed by the laser, the color layer lying underneath appears again. During the reading in a reading device 2 the color print 215, further preferably a UV-fluorescent UV print, in the partial regions 70 is detectable in a first spectral range, preferably the IR range, and/or a second spectral range, further preferably the UV range, and/or a third spectral range, further preferably the VIS range.

A further advantageous embodiment of the method consists of comparing the security element 10 detected by the reading device 2 in a first spectral range, preferably the IR range, and/or in a second spectral range, further preferably the UV range, and the threshold image produced respectively from the detected IR image in the form of a data set, in particular the first data set and/or from the UV image in the form of a data set, in particular the second data set, by software containing algorithms, in particular containing a template matching algorithm, with a template, preferably a template contained in a database, and thus to check the authenticity. Further, the first data set and the second data set, which preferably image the shape of the partial metallization 216 respectively in a first spectral range and a second spectral range, can be compared directly with a corresponding template, preferably a template contained in a database, to check the authenticity of a detected security element 10.

Further, the planar partial regions 70 of the partial metallization 216 of a security element 10 can be shaped by laser as a readable code, preferably machine-readable code, and used for the authenticity check of the security element 10 through the comparison with a stored code, in particular with a code stored in a database, further preferably with an instruction for such a code.

Further, in a further advantageous method the color print 215 exposed by laser in the partial regions 70 of the partial metallization 216 of a security element 10, in particular UV print, further preferably UV-fluorescent UV print, can be provided with a color pattern, wherein the color pattern must lie in perfect register, in particular in register, with the edges of the partial regions 70 and wherein for the authenticity check of the security element 10 the color pattern is compared with a stored color pattern, in particular with a data set imaging the color pattern, further preferably with a data set imaging the color pattern contained in a database.

In a further advantageous method the individual markings shaped into the partial regions 70 of the partial metallization 216 of a security element 10, preferably by a laser, in particular a laser diode, preferably consisting of alphanumeric characters, are detected in one or more spectral ranges by reading device 2 and the thus-generated data sets allocated to the spectral ranges are analyzed by self-learning algorithms, in particular supervised or unsupervised self-learning algorithms, further preferably monitored or unmonitored self-learning image-recognition algorithms and/or pattern-recognition algorithms, and checked for authenticity.

LIST OF REFERENCE NUMBERS 1 security document
1a, 1b security element
10 security feature
10a first security feature
10b second security feature
11 document body
12 decorative layer
13 adhesive layer
14 protective layer
15 security feature of the security document
101, 102, 103, 104, 105, 106 step
2 reading device
21 sensor equipment
22 analysis equipment
23 output equipment
24 radiation sources
25 sensors
26 database
200 distance between center points
201, 203, 205, 207, 207b, 209, 213, 215 print
201a, 203a bounding box of a print
201b, 203b center point of a bounding box of a print
202, 204, 206, 208, 210, 214, 214b, 216 partial metallization
202a, 204a bounding box of a partial metalization
202b, 204b center point of the bounding box of a partial metallization
3 first region
70
6a front side
6b rear side
600 design element 7a image element
7b background region
70 partial region
70a, 70d first partial region
70b, 70e second partial region
70c, 70f third partial region
700 contrast edge
700a structured background region
700b remaining background region
8a metal layer
8b color layer
9a first object
9b second object

The invention claimed is:

1. A method for verifying a security document by means of a reading device wherein first transmission and/or reflection properties of a first region of the security document are detected in a first spectral range by the reading device and a first data set specifying these properties is generated therefrom, wherein the first region at least in some regions overlaps an optical security element arranged on the security document or embedded in the security document and wherein second transmission and/or reflection properties of the first region of the security document are detected in a second spectral range by the reading device and a second data set specifying these properties is generated therefrom, wherein the first spectral range differs from the second spectral range, and wherein the authenticity of the security document and/or of the security element is checked on the basis of the first data set and the second data set,
wherein a threshold image is calculated from the first data set and a threshold image is calculated from the second data set, and
wherein, in each case, the following steps are carried out to calculate the threshold image from the allocated data set:
calculation of an edge image from the allocated data set;
calculation of a black image from the allocated data set;
calculation of a white image from the allocated data set; and
calculation of the threshold image by combining the edge image, the black image and the white image, and
wherein the following steps are carried out to determine the black image:
comparison of the lightness values of the image point data of the allocated data set with a first threshold value, wherein all image points which lie below the first threshold value are allocated the binary value 0.

2. The method according to claim 1, wherein an item of information about the authenticity, of the security element or of the security document is output by the reading device.

3. The method according to claim 1, wherein third and/or fourth transmission and/or reflection properties of the first region of the security document are detected in a third spectral range or in a fourth spectral range by the reading device and a third data set or fourth data set specifying these properties is generated therefrom, wherein the third spectral range or the fourth spectral range differs from the first spectral range and second spectral range, wherein the authenticity of the security document and/or of the security element is checked on the basis of at least the first, the second, the third data set and/or the fourth data set.

4. The method according to claim 3, wherein the first, second, third and/or fourth transmission and/or reflection properties of the first region of the security document are detected in the first, second, third and/or fourth spectral range by the reading device from sides of the front side in reflected light, from sides of the rear side in reflected light and/or in transmitted light and the first, second, third or fourth data set specifying these properties is generated therefrom, wherein at least one of the first detected data sets contains data about the reflection properties in reflected light from the front and/or rear side, data about the reflection properties in reflected light from the front and/or rear side and in transmitted light, and the authenticity of the security document and/or security element is checked on the basis of these data of this data set.

5. The method according to claim 3, wherein the first, second, third and/or fourth spectral range is selected from the group: IR range of the electromagnetic radiation, in particular from a wavelength range of from 850 nm to 950 nm, VIS range of the electromagnetic radiation from a wavelength range of from 400 nm to 700 nm, and UV range of the electromagnetic radiation, from a wavelength range of from 1 nm to 400 nm.

6. The method according to claim 1, wherein the security element of the security document has one or more security features in the first region, and/or wherein the security document in the first region has one or more security features, wherein the security features overlap at least in some regions.

7. The method according to claim 1, wherein the following steps are carried out to check the authenticity of the security document determination of one or more relative values, of two or more security features of the security element and/or of the security document relative to each other by means of the comparison of at least the first data set and the second data set, comparison of the determined one or more relative values of the two or more security features with allocated reference values and denial of the authenticity if the deviation lies outside an allocated tolerance range.

8. The method according to claim 1, wherein to check the authenticity of the security document, the following steps are carried out:
determination of the positional arrangement and/or shaping of a first security feature of the security element by means of the first data set,
determination of the positional arrangement and/or shaping of a second security feature of the security element and/or of the security document by means of the second data set, and
comparison of the determined positional arrangements and/or shaping with each other to determine the relative positional arrangement, of two or more security features of the security element relative to each other or of image elements of two or more of the security features.

9. The method according to claim 6, wherein at least one of the security features has one or more image elements and a background region surrounding the image elements, wherein the contrast between image elements and background region in at least one of the first or second spectral ranges in reflected light and/or transmitted light is greater than 5%, and/or the difference in a reflectance and/or a transmittance is greater than 5%.

10. The method according to claim 6, wherein at least one of the security features has one or more image elements and a background region surrounding the image elements, wherein the contrast between the image elements and the background region in at least one of the first or second spectral ranges in reflected light and/or transmitted light is smaller than 95%.

11. The method according to claim 6, wherein at least one of the security features is formed by a partially shaped metal layer, which is recognizable under IR illumination.

12. The method according to claim 11, wherein the metal layer consists of Al, Cu, Cr, Ag, Au or an alloy thereof.

13. The method according to claim 6, wherein at least one of the security features is formed by a color layer.

14. The method according to claim 13, wherein the color layer is formed substantially transparent in the first spectral range.

15. The method according to claim 13, wherein the color layer has a transmittance in the second spectral range and/or in a partial range of the second spectral range of at most 50%.

16. The method according to claim 13, wherein the color layer is formed or appears luminescent.

17. The method according to claim 13, wherein the color layer is excited by radiation of the second spectral range.

18. The method according to claim 13, wherein at least one of the security features is formed by a relief structure and a reflective layer, wherein the relief structure deflects the incident radiation in a predefined manner in at least one of the spectral ranges.

19. The method according to claim 18, wherein the reflective layer is or appears transparent in at least one of the spectral ranges and is formed by a reflective layer, wherein the reflective layer has a transmittance of more than 50%, and/or a reflectance of less than 50%.

20. The method according to claim 18, wherein the relief structure is formed by a relief structure with optically variable properties and/or comprises one or more of the following relief structures: diffraction grating, asymmetric diffraction structure, isotropic matte structure, anisotropic matte structure, blazed grating, zero-order diffraction structure, light-refractive or focusing structures, in particular microprisms, microlenses.

21. The method according to claim 18, wherein the relief structure is formed by a diffraction structure, which diffracts the incident light in a predetermined manner in one of the first and second spectral ranges, but does not diffract or substantially does not diffract the incident light in the other of the first and second spectral ranges.

22. The method according to claim 6, wherein, to determine the relative shaping of the first security feature and second security feature, the shaping of one or more image elements of the first security feature and one or more image elements of the second security feature is checked for whether the image elements are arranged register-accurate relative to each other.

23. The method according to claim 1, wherein at least one of the first or second data set images the first region through a plurality of image point data, which allocate in each case at least one lightness value to image points of the first region.

24. The method according to claim 23, wherein the lightness value is selected from a given value range, which comprises 256 values.

25. The method according to claim 23, wherein the first, second, third and/or fourth data set allocates in each case one lightness value per color channel to the image points of the first region.

26. The method according to claim 1, wherein at least one of the first or second data set is subjected to an image processing, which comprises one or more of the following steps:
  image filtering, by means of a lowpass filter and/or bilateral filter, template matching, thresholding, bounding box and A-KAZE determination.

27. The method according to claim 1, wherein the edge image is determined from the allocated data set by calculation of an adaptive, binary image.

28. The method according claim 1, wherein to calculate the edge image, a filter, with a filter kernel which is large in comparison with the image resolution, is applied to the allocated data set, wherein the filter carries out a contrasting of the edges.

29. The method according to claim 1, wherein the black image is determined from the allocated data set by calculation of a constant binary image.

30. The method according to claim 1, wherein in the case of the UV range as allocated spectral range, the first threshold value is smaller than 20% of the value range.

31. The method according to claim 1, wherein in the case of the IR range as allocated spectral range, the first threshold value is smaller than 25% of the value range.

32. The method according to claim 1, wherein the white image is determined from the allocated data set by calculation of a constant binary image.

33. The method according to claim 1, wherein the following steps are carried out to determine the white image:
  comparison of the lightness values of the image point data of the allocated data set with a second threshold value, wherein all image points which lie above the second threshold value are allocated the binary value 1, and wherein, the first and the second threshold values differ from each other.

34. The method according to claim 33, wherein the first and/or second threshold value is set depending on the recognized document type, on the recognized illumination and/or the allocated spectral range.

35. The method according to claim 6, wherein at least one of the security features comprises a first object consisting of one or more image elements, wherein the metal of a metal layer is provided in the region of the image elements and the metal of the metal layer of the security feature is not provided in a background region surrounding the image elements.

36. The method according to claim 6, wherein at least one of the security features comprises a second object consisting of one or more image elements, wherein dyes and/or pigments of a color layer of the security feature are provided in the region of the image elements and these dyes and/or pigments of the color layer are not provided or are provided in lower concentration in a background region surrounding the image elements.

37. The method according to claim 35, wherein, from the first data set the first object of the first security feature is detected and a reference point, of the first object is calculated, and wherein,
  from the second data set, the second object of the second security feature is detected and a reference point, of the second object is calculated, and wherein,
  the check of the authenticity of the security document and/or security element is effected through the comparison of the spacing of the calculated reference points, of the first object and second object with a reference value.

38. The method according to claim 37, wherein, to calculate the reference point, of the first and/or second object, in each case a rectangular frame is calculated, which preferably borders the geometric shapes of the first object and/or second object, wherein the reference point, of the rectangular frame is evaluated as reference point, of the first object or second object.

39. The method according to claim 38, wherein the rectangular frame around the largest recognized object is calculated.

40. The method according to claim 37, wherein to calculate the reference point, of the first object and/or second object, in each case a first or second threshold image is calculated from the first and second data set,
in each case a rectangular frame is calculated or produced, wherein the frame lies around all image points of the first threshold image or second threshold image with the binary value 1 or it lies around all image points of the first threshold image or second threshold image with the binary value 0 and wherein the reference point, of the frame is evaluated as reference point, of the first object or second object.

41. The method according to claim 6, wherein a first of the security features and a second of the security features overlap at least in some regions, wherein the first security feature is arranged above the second security feature when observed from a front side of the security element, wherein the first and second security features in each case have one or more image elements and a background region and the image elements of the first security feature are opaque or largely opaque in the second spectral range, and wherein the first data set and the second data set are compared for whether image elements of the second security feature the second data set are imaged only in the region of the background region of the first security feature.

42. The method according to claim 6, wherein a first of the security features and a second of the security features in each case have one or more image elements and a background region, wherein the image elements of the second security feature are transparent or largely transparent in the first spectral range, but in the second spectral range have a contrast to the background region of the second security feature wherein the first and second security features overlap at least in some regions and the second security feature is arranged above the first security element when observed from a front side of the security document.

43. The method according to claim 6 wherein the position and shaping of one or more of the image elements of the second security feature are determined from the second data set, by calculation of a second threshold image, and wherein the position and shaping of one or more of the image elements of the first security feature are determined from the first data set, by calculation of a first threshold image, and wherein key points of the image elements of the first security feature and of the second security feature are determined and the register accuracy of the positioning, shaping and/or orientation of the image elements of the first and second security elements relative to each other is checked on the basis thereof, for whether image elements of the first security feature and of the second security feature are positioned register-accurate relative to each other according to allocated reference values and/or merge into each other and/or match with respect to their incline.

44. The method according to claim 6, wherein the first security feature comprises a partial metal layer and a diffractive structure and wherein the second security feature comprises a partial color layer, wherein the material of the metal layer or of the color layer is provided in one or more image elements of the first security feature and of the second security feature and is not provided in a background region surrounding these, wherein the image elements of the metal layer and of the color layer are shaped congruent with each other, wherein the diffractive structures are designed such that they diffract radiation of the second spectral range, into a sensor of the reading device, but do not diffract radiation of the first spectral range, into the sensor of the reading device.

45. The method according to claim 6, wherein the first security feature comprises a partial metal layer and the second security feature comprises a partial color layer, wherein the material of the metal layer or of the color layer is provided in one or more image elements of the first security feature and of the second security feature and is not provided in a background region surrounding these, wherein several image elements of the color layer are shaped in the form of a machine-readable code, wherein the metal layer is demetallized using a first mask layer, which is shaped in the form of a first item of information, and using a second mask layer, which is formed by the color layer, with the result that the image elements of the metal layer no longer contain the complete first item of information.

46. The method according to claim 45, wherein a machine-readable code and/or the first item of information is calculated by combining the first data set and the second data set.

47. The method according to claim 1, wherein the following steps are further carried out to check the authenticity of the security document, if the security element has a security feature comprising a color layer determination of one or more parameters of the color layer, selected from position, color, ink coverage, reflection, orientation, size, shape, personalization, color change and electromagnetic properties, on the basis of one or more of the first, second, third and fourth data sets, wherein a comparison of the determined one or more parameters with predefined allocated reference values is effected and a denial of the authenticity is effected if the deviation exceeds a predefined tolerance range.

48. The method according to claim 1, wherein the following steps are further carried out to check the authenticity of the security document if the security element has a security feature comprising a metal layer determination of one or more parameters of the metal layer, selected from position, reflection, orientation, size, shape, personalization, area coverage, on the basis of one or more of the first, second, third and fourth data sets, wherein a comparison of the determined one or more parameters with predefined allocated reference values is effected and a denial of the authenticity is effected if the deviation exceeds a predefined tolerance range.

49. The method according to claim 1, wherein the following steps are further carried out to check the authenticity of the security document, if the security element has a security feature comprising an antenna:
determination of one or more parameters of the metal layer, selected from position, electromagnetic properties, design, color, on the basis of one or more of the first, second, third and fourth data sets, wherein a comparison of the determined one or more parameters with predefined allocated reference values is effected and a denial of the authenticity is effected if the deviation exceeds a predefined tolerance range.

50. The method according to claim 1, wherein the following steps are further carried out to check the authenticity of the security document, if the security document underneath the security element has a document background comprising a metal layer and/or color layer:
determination of one or more parameters of the metal layer and/or of the color layer, selected from position, color, ink coverage, reflection, orientation, size, shape, electromagnetic properties, reflection, personalization and area coverage, on the basis of one or more of the first, second, third and fourth data sets, wherein a comparison of the determined one or more parameters with predefined allocated reference values is effected and a denial of the authenticity is effected if the deviation exceeds a predefined tolerance range.

51. The method according to claim 1, wherein the following steps are further carried out to check the authenticity of the security document, if the security element has a security feature comprising an RFID chip:
reading of one or more items of information stored on the RFID chip, which include a specification of one or more security features of the security element and/or code stored in these,
checking of the security document on the basis of the read items of information, for whether one or more security features of the security element correspond to the read specifications and/or include the read code.

52. The method according to claim 1, wherein the following steps are further carried out to check the authenticity of the security document, if the security element has a security feature comprising a diffractive and/or refractive structure:
determination of one or more parameters of the diffractive and/or refractive structure, selected from position, reflection, scattering, gloss, arrangement of the design elements of the diffractive and/or refractive structure, on the basis of one or more of the first, second, third and fourth data sets,
comparison of the determined one or more parameters with predefined allocated reference values and denial of the authenticity if the deviation exceeds a predefined tolerance range.

53. The method according to claim 1, wherein the following steps are further carried out to check the authenticity of the security document, if the security element has a security feature comprising a self-luminous structure:
determination of one or more parameters of the self-luminous structure, selected from luminescence when excited, color when excited, position of the elements of the self-luminous structure, on the basis of one or more of the first, second, third and fourth data sets, comparison of the determined one or more parameters with predefined allocated reference values and denial of the authenticity if the deviation exceeds a predefined tolerance range.

54. The method according to claim 1, wherein the following steps are further carried out to check the authenticity of the security document, if the security document comprises a document body with several layers and/or a window and/or a through-hole region:
determination of one or more parameters of the document body, selected from window position, window shape, position of the layers relative to each other, on the basis of one or more of the first, second, third and fourth data sets,
comparison of the determined one or more parameters with predefined allocated reference values and denial of the authenticity if the deviation exceeds a predefined tolerance range.

55. A security document configured for carrying out the method according to claim 1.

56. A security element for use in a method according to claim 1, wherein the security element of the security document has two or more security features.

57. The security element according to claim 56, wherein two or more of the security features of the security element in each case have a predetermined positional arrangement, in each case a predetermined shaping, a predetermined covering and/or predetermined orientation relative to each other.

58. The security element according to claim 56, wherein at least one of the security features comprises a first object consisting of one or more image elements, wherein the metal of a metal layer is provided in the region of the image elements and the metal of the metal layer is not provided in a background region surrounding the image elements.

59. The security element according to claim 56, wherein at least one of the security features comprises a second object consisting of one or more image elements, wherein dyes and/or pigments of a color layer of the security feature are provided in the region of the image elements and these dyes and/or pigments of the color layer are not provided or are provided in lower concentration in a background region surrounding the image elements.

60. The security element according to claim 56, wherein the security element has a first and a second security feature, wherein a first security feature and a second security feature overlap at least in some regions, wherein the first security feature is arranged above the second security feature when observed from a front side of the security element, wherein the first and second security features in each case have one or more image elements and a background region and the image elements of the first security feature are opaque or largely opaque in the second spectral range.

61. The security element according to claim 56, wherein the security element has a first and/or a second security feature, wherein the first security feature and/or the second security feature in each case comprise one or more image elements and a background region, wherein the image elements of the second security feature are transparent or largely transparent in the first spectral range, but in the second spectral range have a contrast to the background region of the second security feature wherein the first and second security features overlap at least in some regions and the second security feature is arranged above the first security element when observed from a front side of the security document.

62. The security element according to claim 56, wherein the security element has a first and a second security feature, wherein one or more of the image elements of the second security feature and one or more of the image elements of the first security feature are provided register-accurate on the security element with respect to the positioning, shaping and/or orientation of the image elements of the first and second security elements relative to each other.

63. The security element according to claim 56, wherein the security element has a first and a second security feature, wherein the first security feature comprises a partial metal layer and a diffractive structure and the second security feature comprises a partial color layer, wherein the material of the metal layer or of the color layer is provided in one or more image elements of the first security feature and/or of the second security feature and is not provided in a background region surrounding these, wherein the image elements of the metal layer and of the color layer are shaped congruent with each other, wherein the diffractive structures are designed such that they diffract radiation of the second spectral range, but do not diffract radiation of the first spectral range, into the sensor of the reading device.

64. The security element according to claim 56, wherein the security element has a first and a second security feature, wherein the first security feature comprises a partial metal layer and the second security feature comprises a partial color layer, wherein the material of the metal layer or of the color layer is provided in one or more image elements of the first security feature and of the second security feature and is not provided in a background region surrounding these, wherein several image elements of the color layer are shaped in the form of a machine-readable code, wherein the metal layer is shaped in the form of a first item of information using a first mask layer and is demetallized using a second mask layer, consisting of the color layer, with the result that the image elements of the metal layer do not contain the complete first item of information.

65. The security element according to claim 56, further comprising a machine-readable code and/or the first item of information.

66. The security element according to claim 56, further the security element has a security feature comprising an antenna.

67. The security element according to claim 56, wherein the security element has at least one security feature comprising an RFID chip, wherein the RFID chip has stored items of information, which include a specification of one or more security features of the security element and/or code stored therein, wherein the security document can be checked on the basis of the read items of information, for whether one or more of the security features of the security element in each case correspond to the read specifications and/or include the read code.

68. The security document with at least one security element according to claim 56, wherein the security document underneath the security element has a document background comprising a metal layer and/or color layer and/or wherein the security document comprises a document body with several layers and/or a window and/or a through-hole region.

69. A method for verifying a security document by means of a reading device wherein first transmission and/or reflection properties of a first region of the security document are detected in a first spectral range by the reading device and a first data set specifying these properties is generated therefrom, wherein the first region at least in some regions overlaps an optical security element arranged on the security document or embedded in the security document and wherein second transmission and/or reflection properties of the first region of the security document are detected in a second spectral range by the reading device and a second data set specifying these properties is generated therefrom, wherein the first spectral range differs from the second spectral range, and wherein the authenticity of the security document and/or of the security element is checked on the basis of the first data set and the second data set,
   wherein a threshold image is calculated from the first data set and a threshold image is calculated from the second data set, and
   wherein, in each case, the following steps are carried out to calculate the threshold image from the allocated data set:
      calculation of an edge image from the allocated data set;
      calculation of a black image from the allocated data set;
      calculation of a white image from the allocated data set; and
      calculation of the threshold image by combining the edge image, the black image and the white image, and
   wherein the following steps are carried out to determine the white image:
      comparison of the lightness values of the image point data of the allocated data set with a threshold value, wherein all image points which lie above the threshold value are allocated the binary value 1.

70. The method according to claim 69, wherein in the case of the UV range as allocated spectral range, the threshold value is greater than 5% of the value range.

71. The method according to claim 69, wherein, in the IR range as allocated spectral range, the threshold value is greater than 30% of the value range.

72. A method for verifying a security document by means of a reading device wherein first transmission and/or reflection properties of a first region of the security document are detected in a first spectral range by the reading device and a first data set specifying these properties is generated therefrom, wherein the first region at least in some regions overlaps an optical security element arranged on the security document or embedded in the security document and wherein second transmission and/or reflection properties of the first region of the security document are detected in a second spectral range by the reading device and a second data set specifying these properties is generated therefrom, wherein the first spectral range differs from the second spectral range, and wherein the authenticity of the security document and/or of the security element is checked on the basis of the first data set and the second data set,
   wherein a threshold image is calculated from the first data set and a threshold image is calculated from the second data set, and
   wherein, in each case, the following steps are carried out to calculate the threshold image from the allocated data set:
      calculation of an edge image from the allocated data set;
      calculation of a black image from the allocated data set;
      calculation of a white image from the allocated data set; and
      calculation of the threshold image by combining the edge image, the black image and the white image, and
   wherein the following steps are carried out to combine the edge image, the black image and the white image:
      multiplication of the edge image by the black image,
      addition of the white image to the image resulting from the multiplication.

* * * * *